US012801185B2

(12) United States Patent
Lin et al.

(10) Patent No.: US 12,801,185 B2
(45) Date of Patent: Nov. 17, 2026

(54) DISPLAY APPARATUS, DISPLAY DRIVING DEVICE AND DRIVING METHOD FOR FOLDABLE TOUCH DISPLAY PANEL

(71) Applicant: Novatek Microelectronics Corp., Hsinchu (TW)

(72) Inventors: Kun-Zheng Lin, Hsinchu City (TW); Yi-Ying Lin, Hualien County (TW); Chih-Chang Lai, Taichung City (TW)

(73) Assignee: Novatek Microelectronics Corp., Hsinchu (TW)

( * ) Notice: Subject to any disclaimer, the term of this patent is extended or adjusted under 35 U.S.C. 154(b) by 203 days.

(21) Appl. No.: 18/672,037

(22) Filed: May 23, 2024

(65) Prior Publication Data

US 2025/0103106 A1 Mar. 27, 2025

Related U.S. Application Data

(63) Continuation-in-part of application No. 18/427,754, filed on Jan. 30, 2024, now Pat. No. 12,586,509, and a continuation-in-part of application No. 18/474,206, filed on Sep. 25, 2023, now Pat. No. 12,153,753.

(51) Int. Cl.

*G06F 1/16* (2006.01)
*G06F 3/041* (2006.01)
*G06F 3/044* (2006.01)

(52) U.S. Cl.

CPC .......... *G06F 1/1677* (2013.01); *G06F 1/1618* (2013.01); *G06F 1/1643* (2013.01); *G06F 3/0416* (2013.01); *G06F 3/044* (2013.01)

(58) Field of Classification Search

CPC .............................. G06F 3/044; G06F 1/1677
See application file for complete search history.

(56) References Cited

U.S. PATENT DOCUMENTS

| | | | |
|---|---|---|---|
| 7,456,836 | B2 | 11/2008 | Mamiya et al. |
| 7,952,554 | B2 | 5/2011 | Awakura et al. |
| 8,922,605 | B2 | 12/2014 | Todoroki et al. |
| 9,875,522 | B2 | 1/2018 | Urabe et al. |

(Continued)

FOREIGN PATENT DOCUMENTS

| | | |
|---|---|---|
| CN | 112086022 | 12/2020 |
| CN | 116027886 | 4/2023 |

(Continued)

OTHER PUBLICATIONS

"Office Action of Taiwan Counterpart Application", issued on Mar. 31, 2025, p. 1-p. 6.

(Continued)

*Primary Examiner* — Sanghyuk Park
(74) *Attorney, Agent, or Firm* — JCIPRNET

(57) ABSTRACT

A display apparatus including a foldable touch display panel and a display driving device is provided. The foldable touch display panel includes a plurality of touch sensors. The display driving device is coupled to the foldable touch display panel. The display driving device is configured to determine a folding angle of the foldable touch display panel according to a capacitance variation of the touch sensors in a folded state, and drive the foldable touch display panel to operate in a full panel display mode or in a partial panel display mode according to the folding angle.

17 Claims, 26 Drawing Sheets

(56) References Cited

U.S. PATENT DOCUMENTS

| | | | |
|---|---|---|---|
| 10,504,442 B2 | 12/2019 | Yoo | |
| 11,100,900 B2 | 8/2021 | Park et al. | |
| 11,721,302 B2 | 8/2023 | Lin et al. | |
| 2007/0291021 A1 | 12/2007 | Awakura et al. | |
| 2008/0297542 A1 | 12/2008 | Todoroki et al. | |
| 2017/0102738 A1* | 4/2017 | Park | G06F 3/04883 |
| 2017/0115691 A1 | 4/2017 | Aurongzeb et al. | |
| 2017/0212637 A1 | 7/2017 | Choi et al. | |
| 2018/0088633 A1 | 3/2018 | Whitman et al. | |
| 2019/0005884 A1 | 1/2019 | Yoo | |
| 2019/0064950 A1 | 2/2019 | Hsu | |
| 2020/0264826 A1* | 8/2020 | Kwon | G06F 1/1616 |
| 2020/0394984 A1 | 12/2020 | Park et al. | |
| 2021/0210047 A1 | 7/2021 | Lin et al. | |
| 2022/0060572 A1* | 2/2022 | Kwon | H04M 1/0243 |
| 2022/0075473 A1 | 3/2022 | Huang | |
| 2022/0197437 A1 | 6/2022 | Li et al. | |
| 2022/0319388 A1 | 10/2022 | Xian et al. | |
| 2023/0040998 A1 | 2/2023 | Xu et al. | |

FOREIGN PATENT DOCUMENTS

| | | |
|---|---|---|
| TW | 201905641 | 2/2019 |
| TW | I652657 | 3/2019 |
| TW | 202127417 | 7/2021 |

OTHER PUBLICATIONS

"Office Action of Taiwan Related Application, Application No. 113115610", issued on Apr. 10, 2025, p. 1-p. 3.

"Office Action of Taiwan Related Application, Application No. 112142747", issued on Jul. 16, 2024, p. 1-p. 9.

"Office Action of Related U.S. Appl. No. 18/427,754", issued on Aug. 4, 2025, pp. 1-12.

* cited by examiner

DISPLAY APPARATUS, DISPLAY DRIVING DEVICE AND DRIVING METHOD FOR FOLDABLE TOUCH DISPLAY PANEL

CROSS-REFERENCE TO RELATED APPLICATION

This application is a continuation-in-part and claims the priority benefit of U.S. application Ser. No. 18/427,754, filed Jan. 30, 2024, and U.S. application Ser. No. 18/474,206, filed Sep. 25, 2023. The entirety of each of the above-mentioned patent applications is hereby incorporated by reference herein and made a part of this specification.

BACKGROUND

Field of the Disclosure

The disclosure relates to an electronic device, and in particular, to a display apparatus, a display driving device and a driving method.

Description of Related Art

Display panels have been commonly adopted in various types of electronic devices. The display panel may need to operate in different display modes in different operation scenarios. For example, the display panel may be selectively operated in either a full panel display mode or a partial panel display mode. In the full panel display mode, the entire display area of the display panel is utilized to display various information. In the partial panel display mode, part of the display area (normal active area) of the display panel is utilized to display various information, while another part of the display area (inactive area) of the display panel is utilized to display any unimportant images (e.g., black screen). Generally speaking, no matter which display mode the display panel is operated in, the application processor (AP) will transmit the full-frame display data (high-resolution display data) corresponding to the entire display area of the display panel to the display driving device. That is, the display driving device performs various image processing on the full-frame display data corresponding to all display areas, and then drives multiple data lines of the display panel based on the processed display data. Based on the actual design, the image processing performed by the display driving device on the display data may include logical operations, image enhancement or other processing, such as: De-mura, Deburn-in, color enhancement and other image processing.

In partial panel display mode, the display data corresponding to the inactive area of the display panel (unimportant images, such as black screen) will occupy the transmission bandwidth. Furthermore, the display driving device will perform various image processing on the display data in the inactive area, but performing various image processing on the unimportant images (such as black screen) in the inactive area will consume/waste the computing resources and power consumption of the display driving device, and will take up a large amount of storage resources of the display driving device.

On the other hand, with the advancement of display technology, foldable displays have become more mature in recent years. Electronics manufacturers have actively participated in their development and application, particularly integrating them into smartphones, tablet PCs, and notebook computers. In the related art, the folding angle of the foldable displays is detected using Hall sensors and gravity sensors. However, Hall sensors and gravity sensors may occupy space and increase the cost of components, as well as introduce electromagnetic interference.

Furthermore, in certain folded states, if the display panel is always operated in the full panel display mode, it will consume/waste the computing resources and power consumption of the display driving device, and will take up a large amount of storage resources of the display driving device. In addition, when the display panel is folded and operates in the full panel display mode, image compensation operations are necessary for the display panel according to folded states.

SUMMARY OF THE DISCLOSURE

The disclosure provides a display apparatus, a display driving device and a driving method, wherein the display apparatus can selectively operate in either a full panel display mode or a partial panel display mode according to folded states. In addition, the foldable touch display panel can be adaptively compensated according to folded states.

The disclosure provides a display apparatus including a foldable touch display panel and a display driving device. The foldable touch display panel includes a plurality of touch sensors. The display driving device is coupled to the foldable touch display panel. The display driving device is configured to determine a folding angle of the foldable touch display panel according to a capacitance variation of the touch sensors in a folded state, and drive the foldable touch display panel to operate in a full panel display mode or in a partial panel display mode according to the folding angle.

The disclosure provides a display driving device. The display driving device is coupled to the foldable touch display panel. The display driving device is configured to determine a folding angle of the foldable touch display panel according to a capacitance variation of the touch sensors in a folded state, and drive the foldable touch display panel to operate in a full panel display mode or in a partial panel display mode according to the folding angle.

The disclosure provides a driving method of a display apparatus. The display apparatus includes a foldable touch display panel, and the foldable touch display panel includes a plurality of touch sensors. The driving method includes: determining a folding angle of the foldable touch display panel according to a capacitance variation of the touch sensors in a folded state; and driving the foldable touch display panel to operate in a full panel display mode or in a partial panel display mode according to the folding angle.

In order to make the above-mentioned features and advantages of the disclosure more obvious and easy to understand, embodiments are given below and described in detail with reference to the attached drawings.

DESCRIPTION OF EMBODIMENTS

Figure 1:
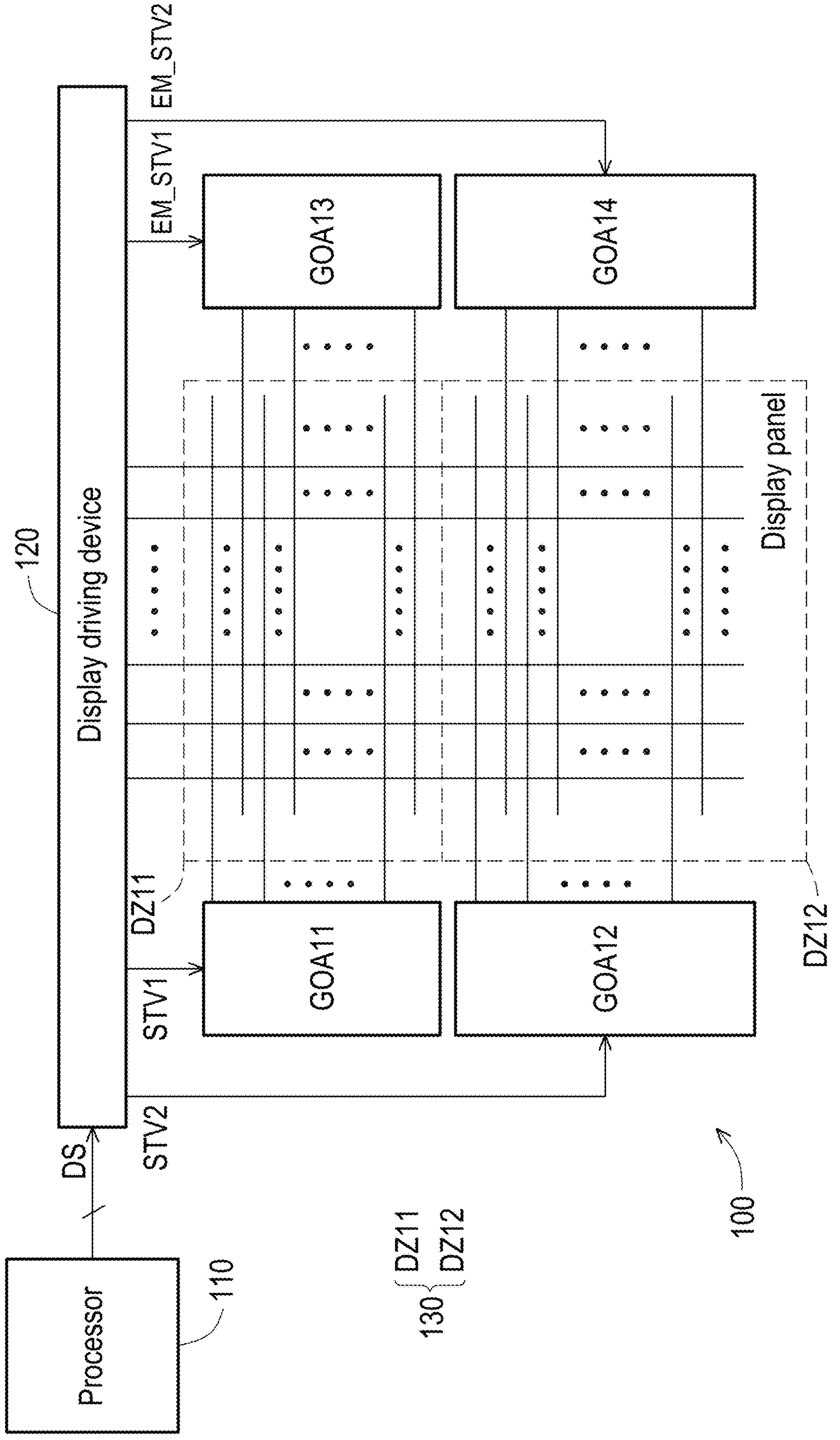
FIG. 1 is a circuit block diagram of a display apparatus according to an embodiment of the disclosure.

The term "coupled (or connected)" used in this specification (including claims) may refer to any direct or indirect connection means. For example, "a first device is coupled (connected) to a second device" should be interpreted as "the first device is directly connected to the second device" or "the first device is indirectly connected to the second device through other devices or connection means". The terms "first" and "second" mentioned in the full text of the specification of the disclosure (including claims) are used to name elements or to distinguish different embodiments or scopes, neither to be used to limit upper or lower limit of the number of elements nor limit the sequence of the elements. In addition, wherever possible, elements/components/steps with the same reference numbers are used in the drawings and embodiments to represent the same or similar parts. Elements/components/steps using the same numbers or using the same terms in different embodiments may serve as cross-reference for each other.

FIG. 1 is a circuit block diagram of a display apparatus 100 according to an embodiment of the disclosure. The display apparatus 100 shown in FIG. 1 includes a processor 110, a display driving device 120 and a display panel 130. This embodiment does not limit the specific implementation of the display panel 130. According to the actual design, the display panel 130 may be an organic light-emitting diode (OLED) display panel or other display panels. The display panel 130 includes a partial display area DZ11 and a partial display area DZ12.

The display panel 130 is provided with a gate scanning circuit GOA11, a gate scanning circuit GOA12, an emission scanning circuit GOA13 and an emission scanning circuit GOA14. According to the actual design, the gate scanning circuit GOA11, the gate scanning circuit GOA12, the emission scanning circuit GOA13 and/or the emission scanning circuit GOA14 may include a gate driver-on-array (GOA) or other scanning circuits. The gate scanning circuit GOA11 is coupled to multiple gate lines (gate scanning lines) in the partial display area DZ11, and the gate scanning circuit GOA12 is coupled to multiple gate lines (gate scanning lines) in the partial display area DZ12. The emission scanning circuit GOA13 is coupled to multiple emission scanning lines in the partial display area DZ11, and the emission scanning circuit GOA14 is coupled to the multiple emission scanning lines in the partial display area DZ12.

This embodiment does not limit the specific implementation of the processor 110. Depending on the actual design, the processor 110 may include an application processor (AP) or other processors. The display driving device 120 is coupled to the processor 110 to receive the data stream DS. For example (but not limited thereto), the processor 110 may output the data stream DS to the display driving device 120 through a mobile industry processor interface (MIPI). The display driving device 120 may retrieve the display data frame and vertical synchronization information from the data stream DS provided by the processor 110. The display driving device 120 may drive the display panel 130 to display images based on the display data frame. According to different designs, in some embodiments, the display driving device 120 may be implemented as a hardware circuit. In other embodiments, the display driving device 120 may be implemented in a combination of hardware, firmware, and software (i.e., program).

In terms of hardware, the display driving device 120 may be implemented as a logic circuit on an integrated circuit. For example, the related functions of the display driving device 120 may be implemented in one or more controllers, microcontrollers, microprocessors, application-specific integrated circuits (ASICs), digital signal processor (DSP), field programmable gate array (FPGA), central processing unit (CPU) and/or other logic blocks, modules and circuits in processing units. The related functions of the display driving device 120 may be implemented as hardware circuits using hardware description languages (such as Verilog HDL or VHDL) or other suitable programming languages, such as various logic blocks, modules and circuits in integrated circuits.

In terms of implementation in the form of software and/or firmware, the related functions of the above display driving device 120 may be implemented as programming codes. For example, the display driving device 120 is implemented using general programming languages (such as C, C++ or combination language) or other suitable programming languages. The programming code may be recorded/stored in a "non-transitory machine-readable storage medium". In some embodiments, the non-transitory machine-readable storage medium includes, for example, a semiconductor memory and/or a storage device. An electronic device (such as a CPU, a controller, a microcontroller or a microprocessor) may read and execute the programming code from the non-transitory machine-readable storage medium, thereby realizing the related functions of the display driving device 120.

The display driving device 120 is coupled to the multiple data lines of the display panel 130. In response to the display panel 130 operating in the full panel display mode, the display data frame received by the display driving device 120 from the processor 110 contains high-resolution display data (first resolution display data) corresponding to the entire display area of the display panel 130. Under the circumstances, the display driving device 120 may drive the data lines of the display panel 130 based on the first resolution display data.

In response to the display panel 130 operating in the partial panel display mode (for example, the first partial panel display mode), the display data frame received by the display driving device 120 from the processor 110 contains the low-resolution display data (the second resolution display data, the resolution of the second resolution display data is lower than the resolution of the first resolution display data) corresponding to the partial display area (normal active area, such as the first partial display area) of the display panel 130, but does not contain the display data corresponding to other display areas (inactive areas) in the display panel 130 except the first partial display area. Under the circumstances, the display driving device 120 may drive the data lines of the display panel 130 based on the second resolution display data.

In response to the display panel 130 operating in another partial panel display mode (for example, the second partial panel display mode), the display data frame received by the display driving device 120 from the processor 110 contains the low-resolution display data (the third resolution display data, the resolution of the third resolution display data is lower than the resolution of the first resolution display data) corresponding to another partial display area (normal active area, such as the second partial display area) of the display panel 130, but does not contain the display data corresponding to other display areas (inactive areas) in the display panel 130 except the second partial display area. Under the circumstances, the display driving device 120 may drive the data lines of the display panel 130 based on the third resolution display data.

For example, when the display panel 130 is operated in a certain "partial panel display mode", the partial display area DZ11 is a normal active area and the partial display area DZ12 is an inactive area. Therefore, the display data frame received by the display driving device 120 from the processor 110 contains the low-resolution display data corresponding to the partial display area DZ11 (but not contain the display data corresponding to the partial display area DZ12). Under the circumstances, the display driving device 120 may drive the data lines of the display panel 130 based on the low-resolution display data corresponding to the partial display area DZ11. When the display panel 130 is operated in another "partial panel display mode", the partial display area DZ12 is a normal active area and the partial display area DZ11 is an inactive area. Therefore, the display data frame received by the display driving device 120 from the processor 110 contains the low-resolution display data corresponding to the partial display area DZ12 (but not contain the display data corresponding to the partial display area DZ11). Under the circumstances, the display driving device 120 may drive the data lines of the display panel 130 based on the low-resolution display data corresponding to the partial display area DZ12.

In summary, the display apparatus 100 may be selectively operated in either the full panel display mode or the partial panel display mode. When the display panel 130 is operated in the first partial panel display mode, the display data frame received by the display driving device 120 from the processor 110 does not contain display data corresponding to other display areas (inactive areas) except the normal active area. Therefore, the amount of data transmitted between the processor 110 and the display driving device 120 and the amount of data transmitted between the display driving device 120 and the display panel 130 may be effectively reduced. Furthermore, because the display data frame does not include display data in the inactive area, the display driving device 120 does not need to perform various image processing on the display data in the inactive area, thereby avoiding consumption/waste of computing resources and power consumption.

Figure 2:
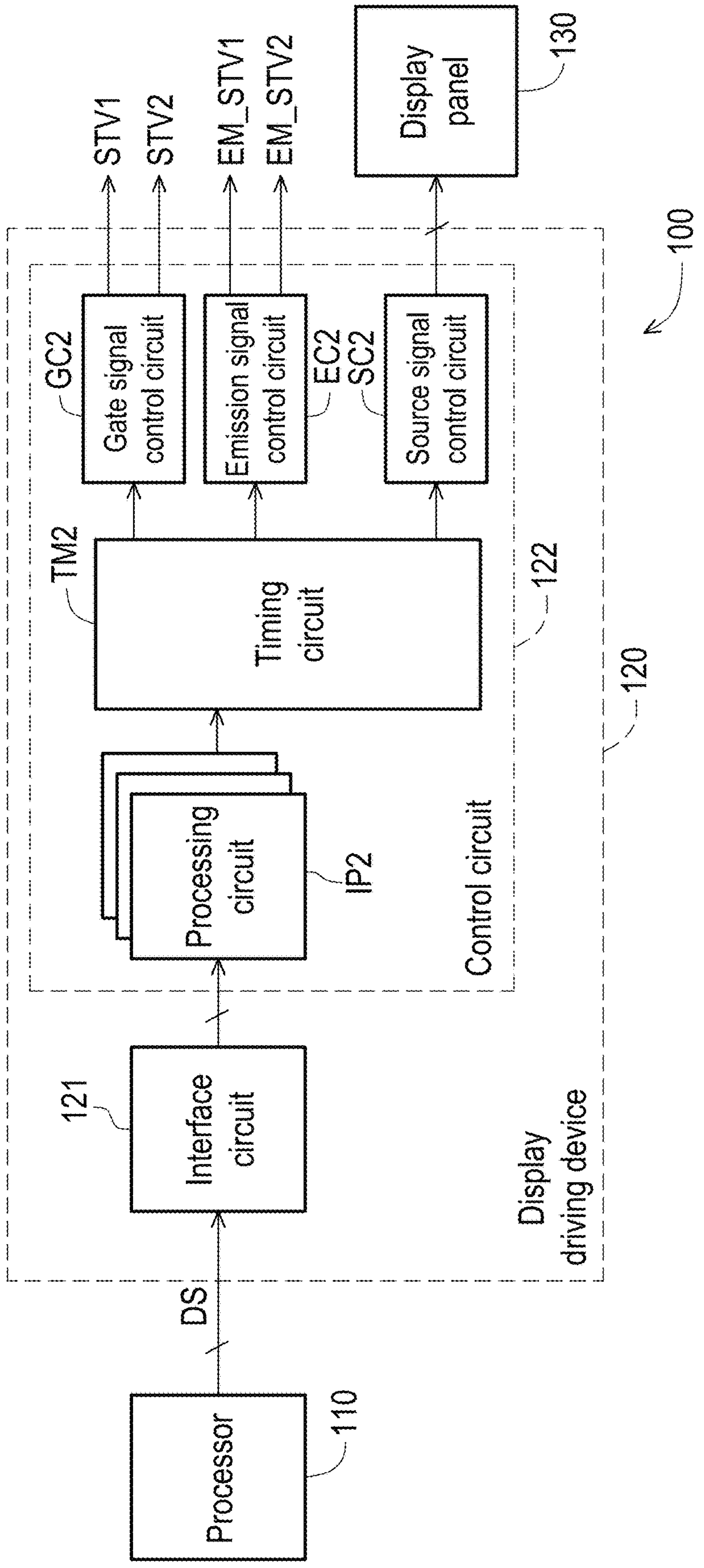
FIG. 2 is a circuit block diagram of a display driving device according to an embodiment of the disclosure.

FIG. 2 is a circuit block diagram of a display driving device 120 according to an embodiment of the disclosure. For the description of the display apparatus 100, the processor 110, the display driving device 120 and the display panel 130 shown in FIG. 2, please refer to the relevant description of the display apparatus 100, the processor 110, the display driving device 120 and the display panel 130 shown in FIG. 1. In the embodiment shown in FIG. 2, the display driving device 120 includes an interface circuit 121 and a control circuit 122. The interface circuit 121 is coupled to the processor 110 to receive the data stream DS. The interface circuit 121 is also coupled to the control circuit 122.

Figure 3:
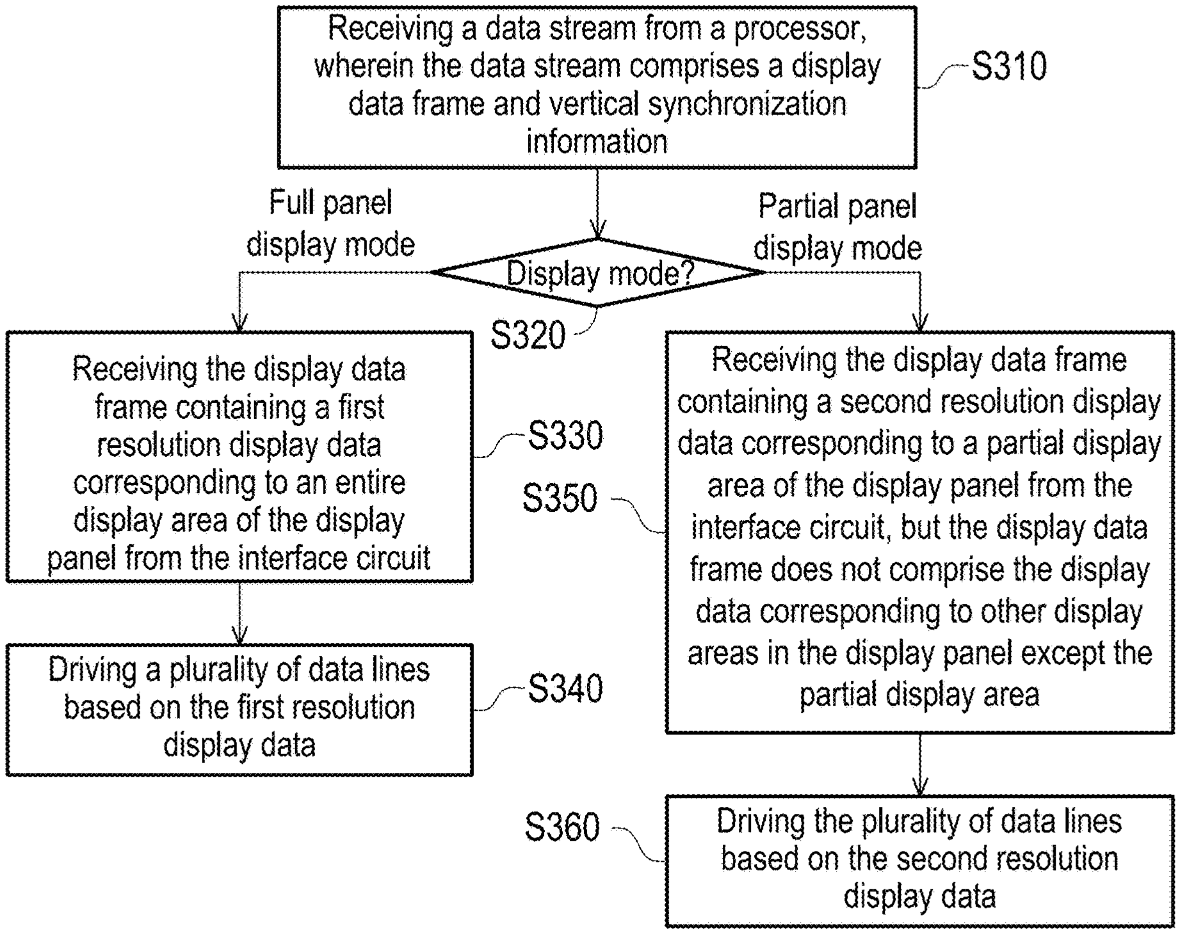
FIG. 3 is a schematic flowchart of a driving method of a display driving device according to an embodiment of the disclosure.

FIG. 3 is a schematic flowchart of a driving method of a display driving device 120 according to an embodiment of the disclosure. Referring to FIG. 2 and FIG. 3, in step S310, the interface circuit 121 receives a data stream DS from the processor 110, wherein the data stream DS includes a display data frame and vertical synchronization information. The interface circuit 121 retrieves the display data frame and vertical synchronization information from the data stream DS and provides them to the control circuit 122. In response to the display panel 130 operating in the full panel display mode (that is, the determining result in step S320 is "full panel display mode"), the control circuit 122 receives a display data frame containing high-resolution display data (first resolution display data) corresponding to the entire display area of the display panel 130 from the interface circuit 121 (step S330).

Figure 4:
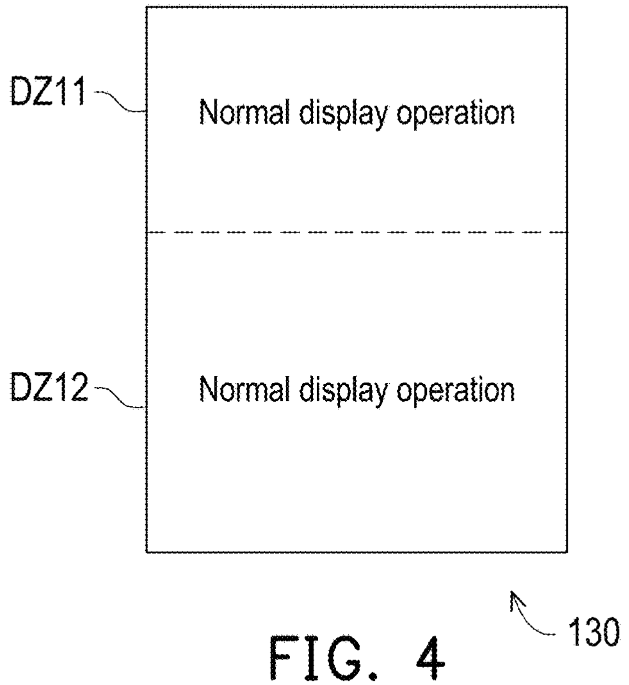
FIG. 4 is a schematic diagram illustrating a display panel operating in a full panel display mode according to an embodiment of the disclosure.

FIG. 4 is a schematic diagram of a display panel 130 operating in a full panel display mode according to an embodiment of the disclosure. Please refer to FIG. 2 and FIG. 4. When the display panel 130 is operated in the full panel display mode, the partial display areas DZ11 and DZ12 of the display driving device 120 are both normal active areas. The control circuit 122 receives the display data frame containing the first resolution display data corresponding to the entire display area (partial display areas DZ11 and DZ12) of the display panel 130 from the interface circuit 121. In step S340, the control circuit 122 drives the multiple data lines of the display panel 130 based on the first resolution display data. Therefore, the partial display areas DZ11 and DZ12 perform normal display operations.

Figure 5:
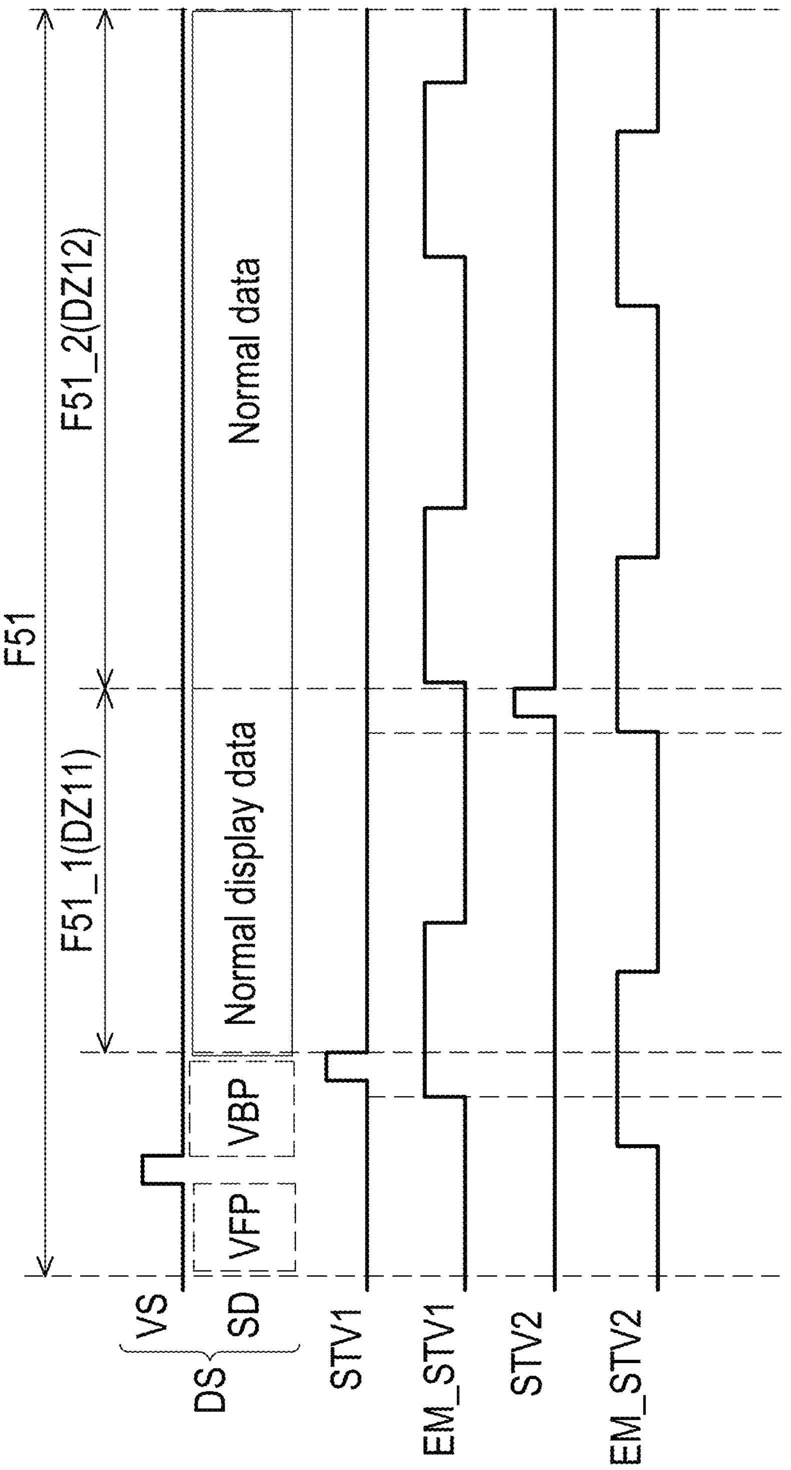
FIG. 5 is a signal timing diagram of a display driving device operating in a full panel display mode according to an embodiment of the disclosure.

FIG. 5 is a signal timing diagram of the display driving device 120 operating in the full panel display mode according to an embodiment of the disclosure. The horizontal axis in FIG. 5 represents time. Referring to FIG. 1, FIG. 2, FIG. 4 and FIG. 5, the interface circuit 121 may retrieve the display data frame SD and the vertical synchronization information VS from the data stream DS provided by the processor 110 and provide them to the control circuit 122. The vertical synchronization information VS defines a frame period, such as a frame period F51 shown in FIG. 5. The frame period F51 corresponding to the display data frame SD includes a porch period and a valid data period (scanning period), wherein the porch period includes a vertical front porch VFP and a vertical back porch VBP. In the full panel display mode, the valid data period (scanning period) includes a sub-frame scanning period F51_1 corresponding to the partial display area DZ11 and a sub-frame scanning period F51_2 corresponding to the partial display area DZ12.

The control circuit 122 provides the gate start pulse signal STV1 shown in FIG. 5 to the gate scanning circuit GOA11 corresponding to the partial display area DZ11, so as to trigger the gate scanning circuit GOA11 to perform gate scanning on the partial display area DZ11 during the sub-frame scanning period F51_1. The control circuit 122 provides the emission start pulse signal EM_STV1 to the emission scanning circuit GOA13 corresponding to the partial display area DZ11 to trigger the emission scanning circuit GOA13 to perform emission scanning on the partial display area DZ11 during the sub-frame scanning period F51_1. Therefore, the partial display area DZ11 may perform normal display operations in the full panel display mode.

The control circuit 122 provides the gate start pulse signal STV2 shown in FIG. 5 to the gate scanning circuit GOA12 corresponding to the partial display area DZ12, so as to trigger the gate scanning circuit GOA12 to perform gate scanning on the partial display area DZ12 during the sub-frame scanning period F51_2. The control circuit 122 provides the emission start pulse signal EM_STV2 to the emission scanning circuit GOA14 corresponding to the partial display area DZ12 to trigger the emission scanning circuit GOA14 to perform emission scanning on the partial display area DZ12 during the sub-frame scanning period F51_2. Therefore, the partial display area DZ12 may perform normal display operations in the full panel display mode.

Referring to FIG. 2 and FIG. 3, in response to the display panel 130 operating in the partial panel display mode (that is, the determining result in step S320 is the "partial panel display mode"), the display data frame received by the control circuit 122 from the interface circuit 121 contains low-resolution display data (second resolution display data) corresponding to the first partial display area (normal active area) of the display panel 130, but does not contain the display data corresponding to other display areas (inactive areas) in the display panel 130 except the first partial display area (step S350), wherein the resolution of the second resolution display data is lower than the resolution of the first resolution display data.

For example, in a certain partial panel display mode (for example, the first partial panel display mode), the display data frame received by the control circuit 122 contains low-resolution display data corresponding to the partial display area DZ11, but does not contain the display data corresponding to the partial display area DZ12. In another partial panel display mode (for example, the second partial panel display mode), the display data frame received by the control circuit 122 contains low-resolution display data corresponding to the partial display area DZ12, but does not contain the display data corresponding to the partial display area DZ11. In step S360, the control circuit 122 drives the multiple data lines of the display panel 130 based on the second resolution display data.

Figure 6:
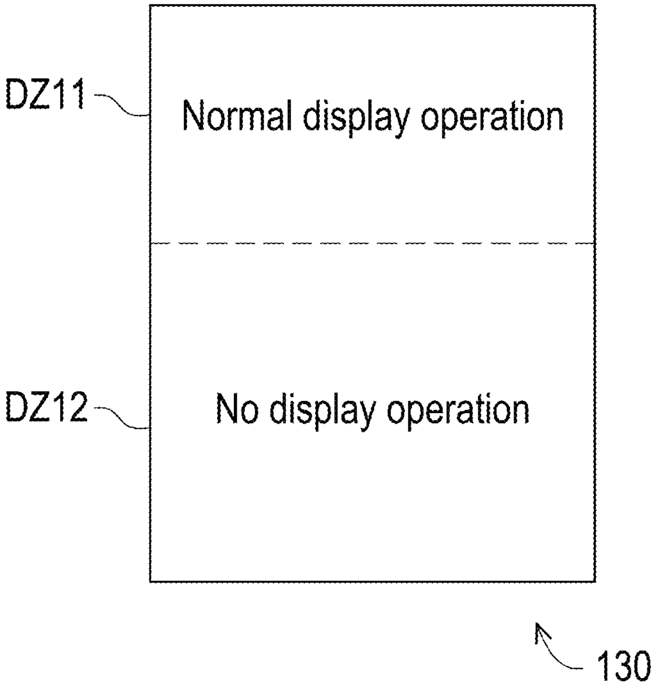
FIG. 6 is a schematic diagram illustrating a display panel operating in a partial panel display mode according to an embodiment of the disclosure.

FIG. 6 is a schematic diagram illustrating a scenario where the display panel 130 is operated in a certain partial panel display mode (for example, the first partial panel display mode) according to an embodiment of the disclosure. Referring to FIG. 2 and FIG. 6, when the display panel 130 is operated in the partial panel display mode, the partial display area DZ11 of the display driving device 120 is a normal active area, and the partial display area DZ12 of the display driving device 120 is an inactive area. The control circuit 122 receives a display data frame containing low-resolution display data corresponding to the partial display area DZ11 from the interface circuit 121. The control circuit 122 drives multiple data lines of the display panel 130 based on the low-resolution display data. Therefore, the partial display area DZ11 may perform normal display operations.

Figure 7:
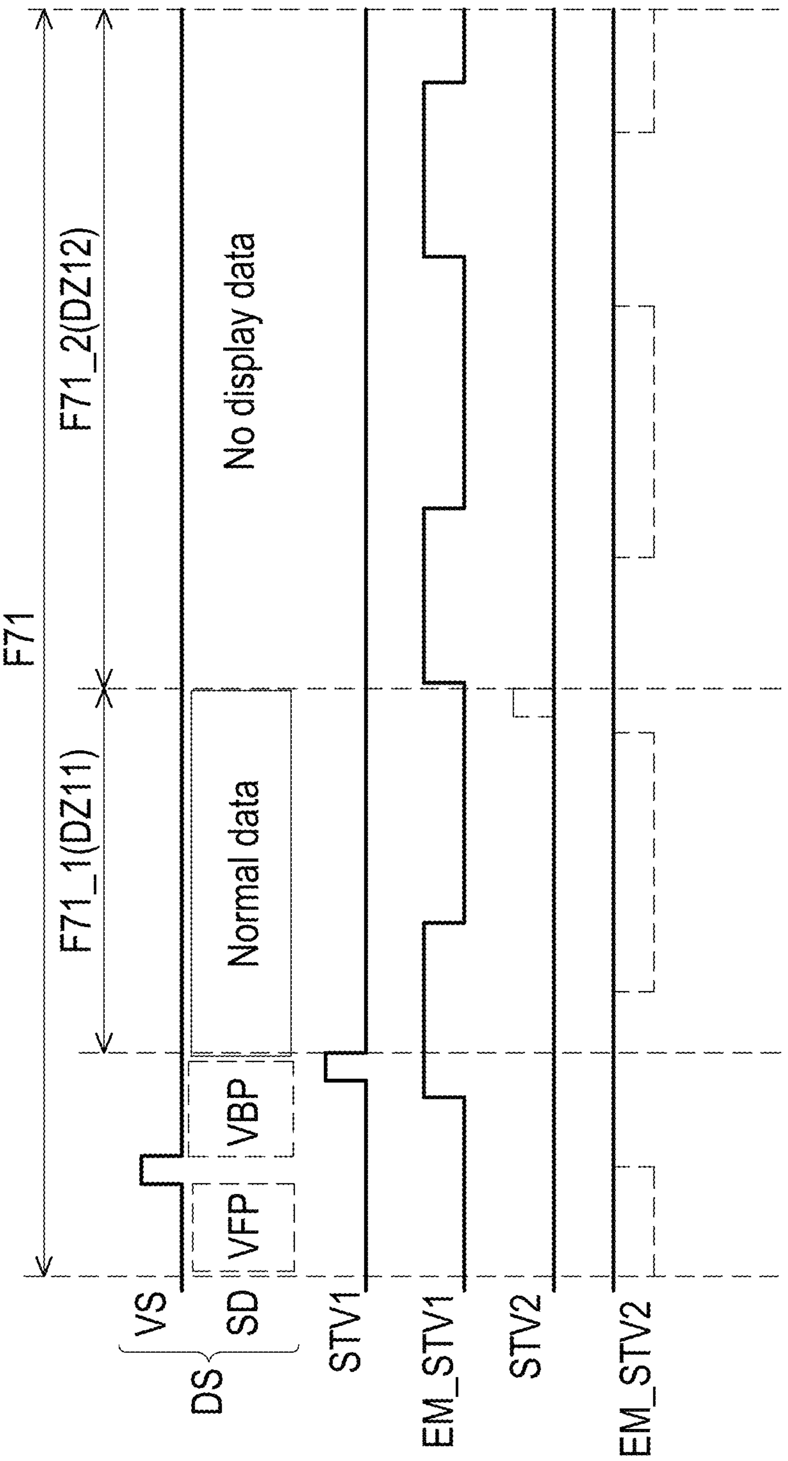
FIG. 7 is a signal timing diagram illustrating a display driving device operating in a partial panel display mode according to an embodiment of the disclosure.

FIG. 7 is a signal timing diagram of the display driving device 120 operating in the partial panel display mode according to an embodiment of the disclosure. The horizontal axis in FIG. 7 represents time. Referring to FIG. 1, FIG. 2, FIG. 6 and FIG. 7, the interface circuit 121 may retrieve the display data frame SD and the vertical synchronization information VS from the data stream DS provided by the processor 110 and provide them to the control circuit 122. The vertical synchronization information VS defines a frame period, such as frame period F71 shown in FIG. 7. The frame period F71 corresponding to the display data frame SD includes a porch period and a scanning period. In the partial panel display mode, the scanning period includes a sub-frame scanning period F71_1 corresponding to the partial display area DZ11 and a sub-frame scanning period F71_2 corresponding to the partial display area DZ12.

The control circuit 122 provides the gate start pulse signal STV1 shown in FIG. 7 to the gate scanning circuit GOA11 corresponding to the partial display area DZ11, so as to trigger the gate scanning circuit GOA11 to perform gate scanning on the partial display area DZ11 during the sub-frame scanning period F71_1. The control circuit 122 drives multiple data lines of the display panel 130 during the sub-frame scanning period F71_1 based on the low-resolution display data corresponding to the partial display area DZ11. The control circuit 122 provides the emission start pulse signal EM_STV1 to the emission scanning circuit GOA13 corresponding to the partial display area DZ11 to trigger the emission scanning circuit GOA13 to perform emission scanning on the partial display area DZ11 during the sub-frame scanning period F71_1. By providing the emission start pulse signal EM_STV1, the partial display area DZ11 of the display panel 130 may be in a normal display state during the entire frame period F71. Therefore, the partial display area DZ11 may perform normal display operations in the partial panel display mode shown in FIG. 6.

Since there is no display data corresponding to the partial display area DZ12 in the control circuit 122, the control circuit 122 maintains the multiple data lines of the display panel 130 in a stable state during the sub-frame scanning period F71_2. For example, the control circuit 122 may output a common voltage (or other fixed voltage) to multiple data lines of the display panel 130 during the sub-frame scanning period F71_2. The control circuit 122 cancels the gate start pulse signal STV2 provided to the gate scanning circuit GOA12 to disable the gate scanning on the partial display area DZ12 performed by the gate scanning circuit GOA12 during the sub-frame scanning period F71_2. The control circuit 122 also cancels the emission start pulse signal EM_STV2 to the emission scanning circuit GOA14 to disable the emission scanning on the partial display area DZ12 performed by the emission scanning circuit GOA14 during the sub-frame scanning period F71_2. By canceling the emission start pulse signal EM_STV2, the partial display area DZ12 of the display panel 130 operates in a non-display state during the entire frame period F71. Therefore, the partial display area DZ12 has no display operation in the partial panel display mode shown in FIG. 6.

Figure 8:
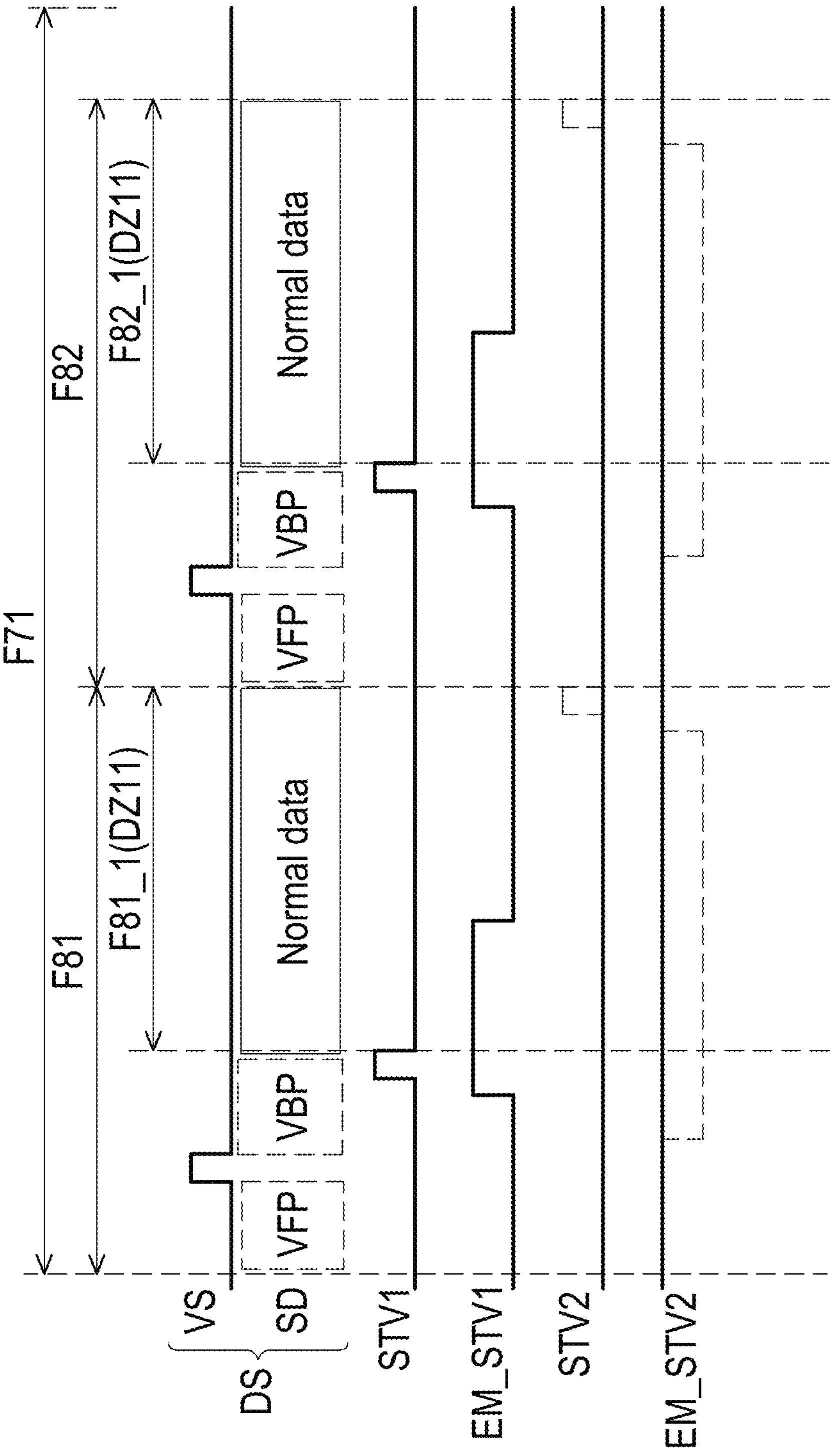
FIG. 8 is a signal timing diagram illustrating a display driving device operating in a partial panel display mode according to another embodiment of the disclosure.

FIG. 8 is a signal timing diagram of the display driving device 120 operating in the partial panel display mode according to another embodiment of the disclosure. The horizontal axis in FIG. 8 represents time. Referring to FIG. 1, FIG. 2, FIG. 6 and FIG. 8, the interface circuit 121 may retrieve the display data frame SD and the vertical synchronization information VS from the data stream DS provided by the processor 110 and provide them to the control circuit 122. The vertical synchronization information VS defines a frame period, such as a frame period F81 and a frame period F82 shown in FIG. 8. The frame period F81 includes a porch period and a scanning period (sub-frame scanning period F81_1 corresponding to the partial display area DZ11). The frame period F82 includes a porch period and a scanning period (sub-frame scanning period F82_1 corresponding to the partial display area DZ11).

For comparison, the frame period F71 shown in FIG. 7 is also shown in FIG. 8. Compared with the frame period F71, the frame period F81 shown in FIG. 8 does not include the sub-frame scanning period F71_2 corresponding to the partial display area DZ12. For the frame period F82 shown in FIG. 8, reference may be made to the relevant description of the frame period F81 by analogy.

The control circuit 122 provides the gate start pulse signal STV1 shown in FIG. 8 to the gate scanning circuit GOA11 corresponding to the partial display area DZ11, so as to trigger the gate scanning circuit GOA11 to perform gate scanning on the partial display area DZ11 during the sub-frame scanning period F81_1. The control circuit 122 drives multiple data lines of the display panel 130 during the sub-frame scanning period F81_1 based on the low-resolution display data corresponding to the partial display area DZ11. The control circuit 122 provides the emission start pulse signal EM_STV1 to the emission scanning circuit GOA13 corresponding to the partial display area DZ11 to trigger the emission scanning circuit GOA13 to perform emission scanning on the partial display area DZ11 during the sub-frame scanning period F81_1. By providing the emission start pulse signal EM_STV1, the partial display area DZ11 of the display panel 130 operates in a normal display state during the entire frame period F81. Therefore, the partial display area DZ11 may perform normal display operations in the partial panel display mode shown in FIG. 6.

The control circuit 122 cancels the gate start pulse signal STV2 provided to the gate scanning circuit GOA12 to disable the gate scanning on the partial display area DZ12 performed by the gate scanning circuit GOA12. The control circuit 122 also cancels the emission start pulse signal EM_STV2 to the emission scanning circuit GOA14 to disable the emission scanning on the partial display area DZ12 performed by the emission scanning circuit GOA14. By canceling the emission start pulse signal EM_STV2, the partial display area DZ12 of the display panel 130 operates in a non-display state during the entire frame period F81. Therefore, the partial display area DZ12 has no display operation in the partial panel display mode shown in FIG. 6.

Figure 9:
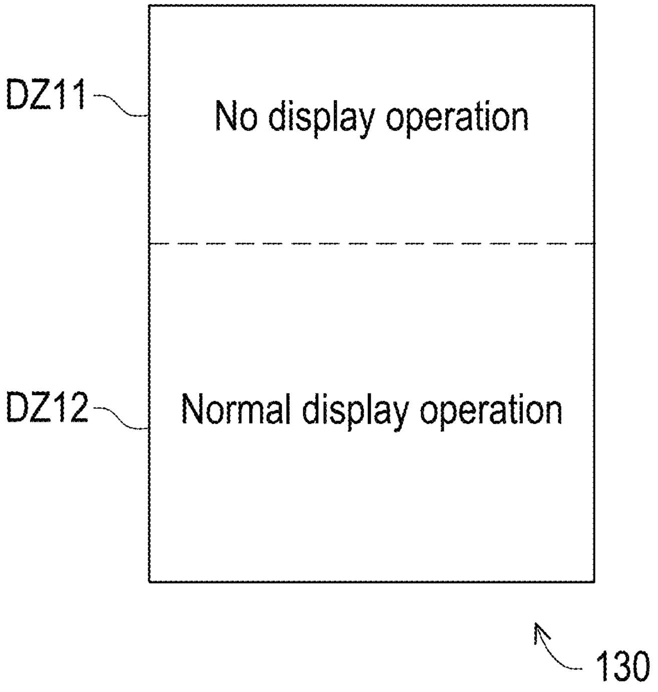
FIG. 9 is a schematic diagram illustrating a display panel operating in another partial panel display mode according to an embodiment of the disclosure.

FIG. 9 is a schematic diagram illustrating a scenario where the display panel 130 is operated in another partial panel display mode (for example, the second partial panel display mode) according to an embodiment of the disclosure. Referring to FIG. 2 and FIG. 9, when the display panel 130 is operated in the partial panel display mode, the partial display area DZ12 of the display driving device 120 is a normal active area, and the partial display area DZ11 of the display driving device 120 is an inactive area. The control circuit 122 receives a display data frame containing low-resolution display data (e.g., third resolution display data) corresponding to the partial display area DZ12 from the interface circuit 121. The control circuit 122 drives multiple data lines of the display panel 130 based on the low-resolution display data. Therefore, the partial display area DZ12 may perform normal display operations.

Figure 10:
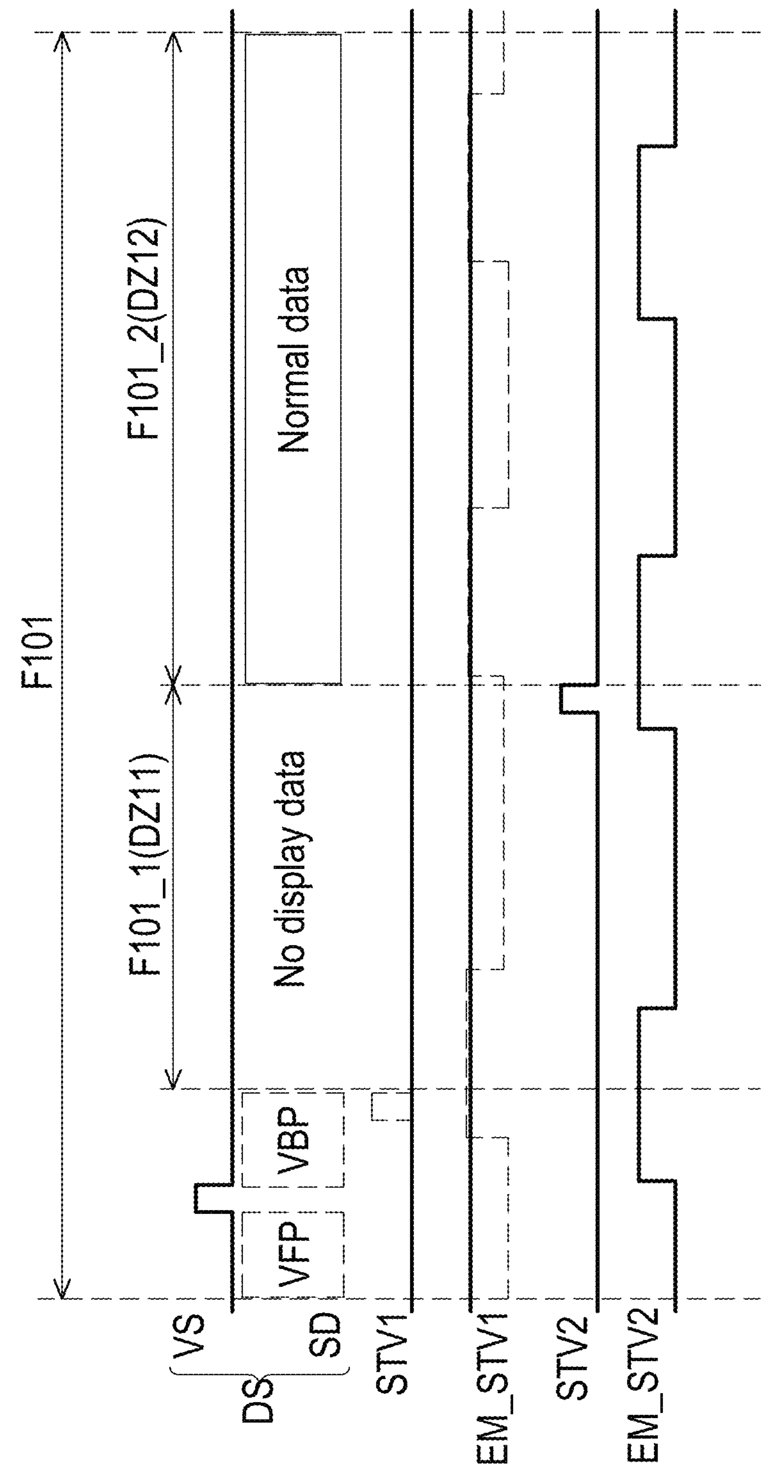
FIG. 10 is a signal timing diagram illustrating a display driving device operating in another partial panel display mode according to an embodiment of the disclosure.

FIG. 10 is a signal timing diagram of the display driving device 120 operating in the partial panel display mode according to another embodiment of the disclosure. The horizontal axis in FIG. 10 represents time. Referring to FIG. 1, FIG. 2, FIG. 9 and FIG. 10, the interface circuit 121 may retrieve the display data frame SD and the vertical synchronization information VS from the data stream DS provided by the processor 110 and provide them to the control circuit 122. The vertical synchronization information VS defines a frame period, such as frame period F101 shown in FIG. 10. The frame period F101 corresponding to the display data frame SD includes a porch period and a scanning period. In the partial panel display mode, the scanning period includes a sub-frame scanning period F101_1 corresponding to the partial display area DZ11 and a sub-frame scanning period F101_2 corresponding to the partial display area DZ12.

Since there is no display data corresponding to the partial display area DZ11 in the control circuit 122, the control circuit 122 maintains the multiple data lines of the display panel 130 in a stable state during the sub-frame scanning period F101_1. For example, the control circuit 122 may output a common voltage (or other fixed voltage) to multiple data lines of the display panel 130 during the sub-frame scanning period F101_1. The control circuit 122 cancels the gate start pulse signal STV1 provided to the gate scanning circuit GOA11 to disable gate scanning on the partial display area DZ11 performed by the gate scanning circuit GOA11 during the sub-frame scanning period F101_1. The control circuit 122 also cancels the emission start pulse signal EM_STV1 provided to the emission scanning circuit GOA13 to disable the emission scanning on the partial display area DZ11 performed by the emission scanning circuit GOA13 during the sub-frame scanning period F101_1. By canceling the emission start pulse signal EM_STV1, the partial display area DZ11 of the display panel 130 operates in a non-display state during the entire frame period F101. Therefore, the partial display area DZ11 has no display operation in the partial panel display mode shown in FIG. 9.

The control circuit 122 provides the gate start pulse signal STV2 shown in FIG. 10 to the gate scanning circuit GOA12 corresponding to the partial display area DZ12, so as to trigger the gate scanning circuit GOA12 to perform gate scanning on the partial display area DZ12 during the sub-frame scanning period F101_2. The control circuit 122 drives multiple data lines of the display panel 130 during the sub-frame scanning period F101_2 based on the low-resolution display data corresponding to the partial display area DZ12. The control circuit 122 provides the emission start pulse signal EM_STV2 to the emission scanning circuit GOA14 corresponding to the partial display area DZ12 to trigger the emission scanning circuit GOA14 to perform emission scanning on the partial display area DZ12 during the sub-frame scanning period F101_2. By providing the emission start pulse signal EM_STV2, the partial display area DZ12 of the display panel 130 may be in a normal display state during the entire frame period F101. Therefore, the partial display area DZ12 may perform normal display operations in the partial panel display mode shown in FIG. 9.

Figure 11:
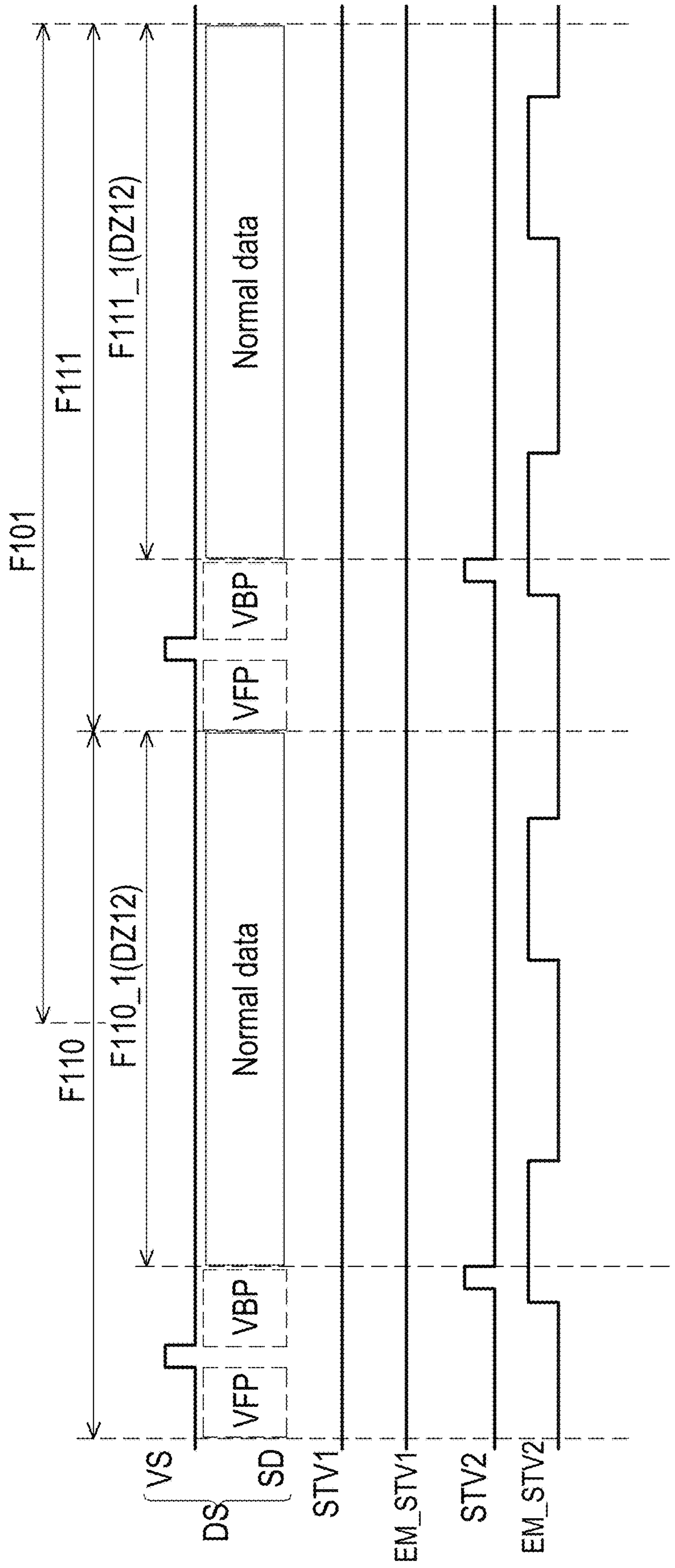
FIG. 11 is a signal timing diagram illustrating a display driving device operating in another partial panel display mode according to still another embodiment of the disclosure.

FIG. 11 is a signal timing diagram of the display driving device 120 operating in the partial panel display mode according to yet another embodiment of the disclosure. The horizontal axis in FIG. 11 represents time. Referring to FIG. 1, FIG. 2, FIG. 9 and FIG. 11, the interface circuit 121 may retrieve the display data frame SD and the vertical synchronization information VS from the data stream DS provided by the processor 110 and provide them to the control circuit 122. The vertical synchronization information VS defines a frame period, such as the frame period F110 and the frame period F111 shown in FIG. 11. The frame period F110 includes a porch period and a scanning period (sub-frame scanning period F110_1 corresponding to the partial display area DZ12). The frame period F111 includes a porch period and a scanning period (sub-frame scanning period F111_1 corresponding to the partial display area DZ12).

For comparison, the frame period F101 shown in FIG. 10 is also shown in FIG. 11. Compared with the frame period F101, the frame period F111 shown in FIG. 11 does not have the sub-frame scanning period F101_1 corresponding to the partial display area DZ11. For the frame period F110 shown in FIG. 11, reference may be made to the relevant description of the frame period F111 by analogy.

The control circuit 122 cancels the gate start pulse signal STV1 provided to the gate scanning circuit GOA11 to disable the gate scanning on the partial display area DZ11 performed by the gate scanning circuit GOA11. The control circuit 122 also cancels the emission start pulse signal EM_STV1 provided to the emission scanning circuit GOA13 to disable the emission scanning on the partial display area DZ11 performed by the emission scanning circuit GOA13. By canceling the emission start pulse signal EM_STV1, the partial display area DZ11 of the display panel 130 operates in a non-display state during the entire frame period F111. Therefore, the partial display area DZ11 has no display operation in the partial panel display mode shown in FIG. 9.

The control circuit 122 provides the gate start pulse signal STV2 shown in FIG. 11 to the gate scanning circuit GOA12 corresponding to the partial display area DZ12, so as to trigger the gate scanning circuit GOA12 to perform gate scanning on the partial display area DZ12 during the sub-frame scanning period F111_1. The control circuit 122 drives multiple data lines of the display panel 130 during the sub-frame scanning period F111_1 based on the low-resolution display data corresponding to the partial display area DZ12. The control circuit 122 provides the emission start pulse signal EM_STV2 to the emission scanning circuit GOA14 corresponding to the partial display area DZ12 to trigger the emission scanning circuit GOA14 to perform emission scanning on the partial display area DZ12 during the sub-frame scanning period F111_1. By providing the emission start pulse signal EM_STV2, the partial display area DZ12 of the display panel 130 operates in a normal display state throughout the frame period F111. Therefore, the partial display area DZ12 may perform a normal display operation in the partial panel display mode shown in FIG. 9.

In the embodiment shown in FIG. 2, the control circuit 122 includes a processing circuit IP2, a timing circuit TM2, a gate signal control circuit GC2, an emission signal control circuit EC2, and a source signal control circuit SC2. The number of processing circuits IP2 may be one or more. The processing circuit IP2 is coupled to the interface circuit 121 to receive the display data frame. The processing circuit IP2 may perform at least one image processing on the display data frame to generate a processed data frame. Based on the actual design, in some embodiments, the image processing performed by the processing circuit IP2 on the display data frame may include logical operations, image enhancement or other processing, such as: De-mura, Deburn-in, color enhancement and other image processing.

The timing circuit TM2 is coupled to the processing circuit IP2 to receive the processed data frame. The timing circuit TM2 controls the operation timing of the control circuit 122 based on the vertical synchronization information VS (not shown in FIG. 2). The gate signal control circuit GC2 and the emission signal control circuit EC2 are coupled to the timing circuit TM2. The timing circuit TM2 may control the operation timing of the gate signal control circuit GC2 and the emission signal control circuit EC2. The source signal control circuit SC2 is also coupled to the timing circuit TM2 to receive the processed data frame. Based on the timing control of the timing circuit TM2, the source signal control circuit SC2 may drive the data lines of the display panel 130 in accordance with the scanning timing of the scanning circuit.

In the full panel display mode, the processed data frame received by the source signal control circuit SC2 from the timing circuit TM2 contains the first resolution display data (high-resolution display data corresponding to the entire display area of the display panel 130). The source signal control circuit SC2 drives the data lines of the display panel 130 based on the first resolution display data. Based on the timing control of the timing circuit TM2, the gate signal control circuit GC2 provides the gate start pulse signal STV1 to the gate scanning circuit GOA11 corresponding to the partial display area DZ11 to trigger the gate scanning circuit GOA11 to perform gate scanning on the partial display area DZ11 during the first sub-frame scanning period. The gate signal control circuit GC2 provides the gate start pulse signal STV2 to the gate scanning circuit GOA12 corresponding to the partial display area DZ12 to trigger the gate scanning circuit GOA12 to perform gate scanning on the partial display area DZ12 during the second sub-frame scanning period. In addition, based on the timing control of the timing circuit TM2, the emission signal control circuit EC2 provides the emission start pulse signal EM_STV1 to the emission scanning circuit GOA13 corresponding to the partial display area DZ11 to trigger the emission scanning circuit GOA13 to perform emission scanning on the partial display area DZ11 during the first sub-frame scanning period. The emission signal control circuit EC2 provides the emission start pulse signal EM_STV2 to the emission scanning circuit GOA14 corresponding to the partial display area DZ12 to trigger the emission scanning circuit GOA14 to perform emission scanning on the partial display area DZ12 during the second sub-frame scanning period. Description of the operation of the control circuit 122 in the full panel display mode may be derived from the relevant descriptions of FIG. 3, FIG. 4 and FIG. 5, and therefore related details will not be described again.

Please refer to FIG. 1, FIG. 2, FIG. 6 and FIG. 7. In the first partial panel display mode, the processed data frame received by the source signal control circuit SC2 from the timing circuit TM2 contains the second resolution display data corresponding to the partial display area DZ11 (but not contain the display data corresponding to other display areas except the partial display area DZ11), and the source signal control circuit SC2 drives the data lines of the display panel 130 based on the second resolution display data. The gate signal control circuit GC2 provides the gate start pulse signal STV1 to the gate scanning circuit GOA11 based on the timing control of the timing circuit TM2 to trigger the gate scanning circuit GOA11 to perform gate scanning on the partial display area DZ11 during the sub-frame scanning period F71_1. The source signal control circuit SC2 drives the data lines of the display panel 130 during the sub-frame scanning period F71_1 based on the second resolution display data. The gate signal control circuit GC2 cancels the gate start pulse signal STV2 to disable the gate scanning on the partial display area DZ12 performed by the scanning circuit GOA12 during the sub-frame scanning period F71_2. Since there is no display data corresponding to the partial display area DZ12 in the source signal control circuit SC2, the source signal control circuit SC2 maintains the data lines of the display panel 130 at a steady state (fixed voltage) during the sub-frame scanning period F71_2. Based on the timing control of the timing circuit TM2, the emission signal control circuit EC2 provides the first emission start pulse signal EM_STV1 to the emission scanning circuit GOA13 to trigger the emission scanning circuit GOA13 to perform emission scanning on the partial display area DZ11 during the sub-frame scanning period F71_1. The emission signal control circuit EC2 cancels the emission start pulse signal EM_STV2 to disable the emission scanning on the partial display area DZ12 performed by the emission scanning circuit GOA14 during the sub-frame scanning period F71_2.

Please refer to FIG. 1, FIG. 2, FIG. 6 and FIG. 8. In the first partial panel display mode, the gate signal control circuit GC2 provides the gate start pulse signal STV1 to the gate scanning circuit GOA11 corresponding to the partial display area DZ11 based on the timing control of the timing circuit TM2 to trigger the gate scanning circuit GOA11 to perform gate scanning on the partial display area DZ11 during the sub-frame scanning period F81_1. The source signal control circuit drives the data lines of the display panel 130 during the sub-frame scanning period F81_1 based on the second resolution display data corresponding to the partial display area DZ11. The gate signal control circuit GC2 cancels the gate start pulse signal STV2 provided to the gate scanning circuit GOA12 to disable the gate scanning on the partial display area DZ12 performed by the gate scanning circuit GOA12. Based on the timing control of the timing circuit TM2, the emission signal control circuit EC2 provides a first emission start pulse signal EM_STV1 to the emission scanning circuit GOA13 corresponding to the first partial display area DZ11 to trigger the emission scanning circuit GOA13 to perform emission scanning on the partial display area DZ11 during the sub-frame scanning period F81_1. The emission signal control circuit EC2 cancels the emission start pulse signal EM_STV2 provided to the emission scanning circuit GOA14 to disable the emission scanning on the partial display area DZ12 performed by the emission scanning circuit GOA14.

In summary, the control circuit 122 may be selectively operated in either the full panel display mode or the partial panel display mode. When the display panel 130 is operated in the first partial panel display mode, the display data frame does not contain display data corresponding to other display areas (inactive areas) except the normal active area. Therefore, the amount of data transmitted in the transmitting channel may be effectively reduced. Furthermore, because the display data frame does not include display data in the inactive area, the processing circuit IP2 does not need to perform various image processing on the display data in the inactive area, thereby avoiding consumption/waste of computing resources and power consumption.

Figure 12:
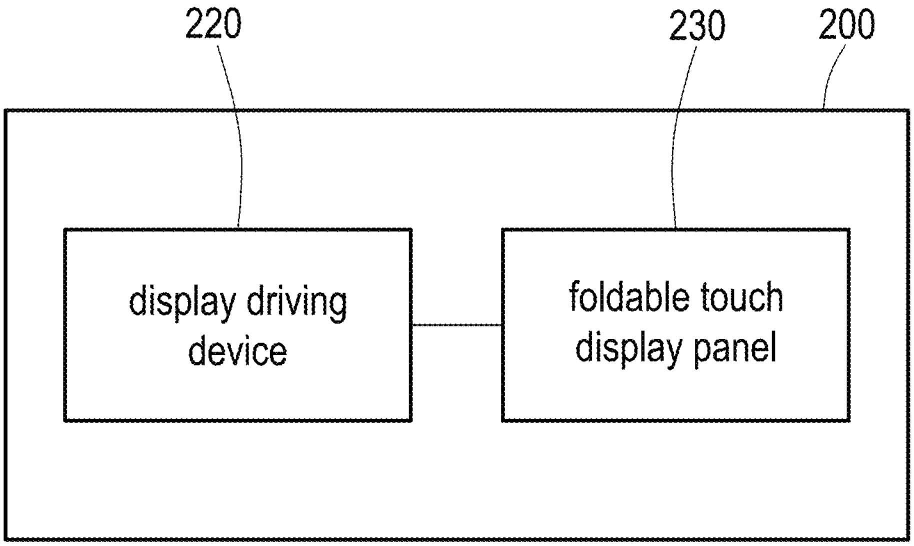
FIG. 12 is a circuit block diagram of a display apparatus according to another embodiment of the disclosure.

FIG. 12 is a circuit block diagram of a display apparatus according to another embodiment of the disclosure. Referring to FIG. 12, the display apparatus 200 includes a display driving device 220 and a foldable touch display panel 230. The foldable touch display panel 230 includes display pixels and touch sensors. The foldable touch display panel 230 can be folded in a folded state. The display driving device 220 is configurable to be coupled to the foldable touch display panel 230. The display driving device 220 is configured to drive the foldable touch display panel 230 to perform a display operation and a touch sensing operation.

In the present embodiment, the display driving device 220 is also configured to determine a folding angle of the foldable touch display panel 230 according to a capacitance variation of the touch sensors when the foldable touch display panel 230 is folded. For example, in the folded state, the folding angle between the first portion and the second portion of the foldable touch display panel 230 may be determined according to the capacitance variation of the first touch sensors and the second touch sensors, wherein the first touch sensors are disposed on the first portion, and the second touch sensors are disposed on the second portion.

In an embodiment, the display apparatus 200 may be, but not limited to, a smartphone, a non-smart phone, a wearable electronic device, a tablet computer, a personal digital assistant, a notebook and other portable electronic devices that can operate independently and have the display function and the touch sensing function. In an embodiment, the display apparatus 200 may be, but not limited to, a portable or un-portable electronic device in a vehicle intelligent system.

In an embodiment, the display driving device 220 may include a display driving circuit, a touch sensing circuit and a fingerprint sensing circuit and be implemented as a single chip integrated circuit that can drive and control the foldable touch display panel 230 to perform the display operation, the touch sensing operation and/or a fingerprint sensing operation. The display driving device 220 may include a control circuit, and the control circuit may be a micro-controller based core to perform all of control activities of the display operation, the touch sensing operation and/or the fingerprint sensing operation. The control circuit may include at least one of a timing controller, a touch controller, a digital circuit, and the other controllers or processors of the display driving circuit, the touch sensing circuit and the fingerprint sensing circuit.

FIG. 13A to FIG. 13G respectively illustrate the foldable touch display panel which has different folding angles according to embodiments of the disclosure. Referring to FIG. 13A to FIG. 13G, the foldable touch display panel 230 includes a foldable substrate 124, a plurality of first touch sensors 122_1 and a plurality of second touch sensors 122_2. The foldable substrate 124 includes a first portion 241 and a second portion 242. The first touch sensors 122 1 are disposed on the first portion 241, and the second touch sensors 122_2 are disposed on the second portion 242. The first portion 241 and the second portion 242 can face each other in the folded state. The folding angle θ1, θ2, θ3, θ4, θ5, θ6 and θ7 between the first portion 241 and the second portion 242 of FIG. 13A, FIG. 13B, FIG. 13C, FIG. 13D, FIG. 13E, FIG. 13F and FIG. 13G are 180 degrees, 150 degrees, 120 degrees, 90 degrees, 60 degrees, 30 degrees and 0 degree, respectively. The folding angle θ between the first portion 241 and the second portion 242 can be determined according to a capacitance variation of the first touch sensor 122_1 and the second touch sensor 122_2.

The relationship between the capacitance variations and the folding angles may be stored in a memory circuit of the display driving device 220 in a form of a lookup table. For example, table 1 shows the relationship between the capacitance variations and the folding angles and is stored in the memory circuit.

TABLE 1

| capacitance variations | folding angles (degrees) |
|---|---|
| ΔC1 | 180 |
| ΔC2 | 150 |
| ΔC3 | 120 |
| ΔC4 | 90 |
| ΔC5 | 60 |
| ΔC6 | 30 |
| ΔC7 | 0 |

Other capacitance variations and folding angles that are not stored in the lookup table can be obtained by interpolation. The folding angle decreases as the capacitance variation increases. Therefore, the folding angle between the first portion 241 and the second portion 242 can be determined according to the lookup table, e.g. table 1, after the capacitance variation is calculated.

Figure 13A:
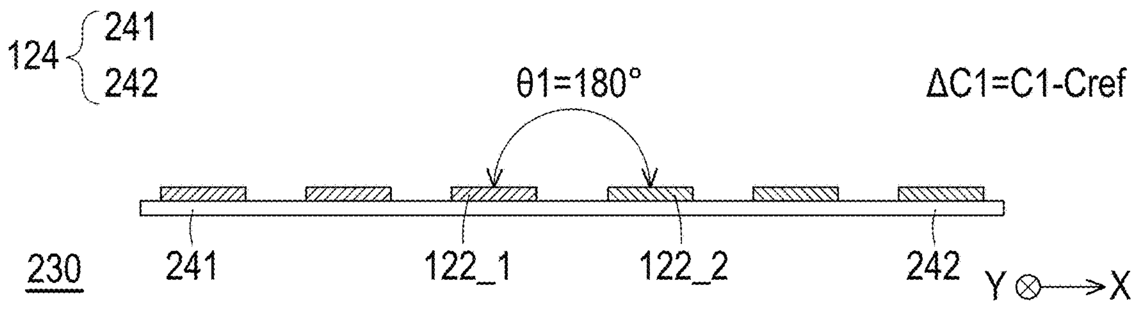
FIG. 13A, FIG. 13B, FIG. 13C, FIG. 13D, FIG. 13E, FIG. 13F and FIG. 13G respectively illustrate the foldable touch display panel which has different folding angles according to embodiments of the disclosure.
Figure 13B:
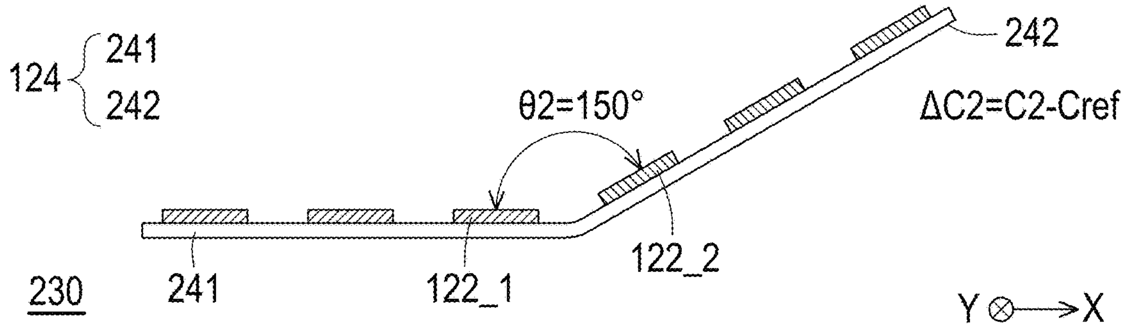

Taking FIG. 13A and FIG. 13B for example, in FIG. 13A, the folding angle θ1 is 180 degrees, and a capacitance value C1 between the first touch sensor 122_1 and the second touch sensor 122_2 can be taken as a reference Cref. In FIG. 13B, when the foldable touch display panel 230 is folded, a capacitor with a capacitance value C2 between the first touch sensor 122_1 and the second touch sensor 122_2 is generated and can be sensed, and thus a capacitance variation ΔC2 of the first touch sensor 122_1 and the second touch sensor 122_2 relative to the capacitance value Cref is calculated. That is, the capacitance variation ΔC2=C2−Cref can be calculated. The folding angle θ2 between the first portion 241 and the second portion 242 can be determined as 150 degrees according to the capacitance variation ΔC2 of the first touch sensor 122_1 and the second touch sensor 122_2 and the lookup table.

In table 1, the capacitance variation ΔC1 can be deemed as 0 since the capacitance variation ΔC1=C1−Cref=0 when the capacitance value C1 of the folding angle θ1 is taken as a reference to calculate capacitance variations.

Figure 13C:
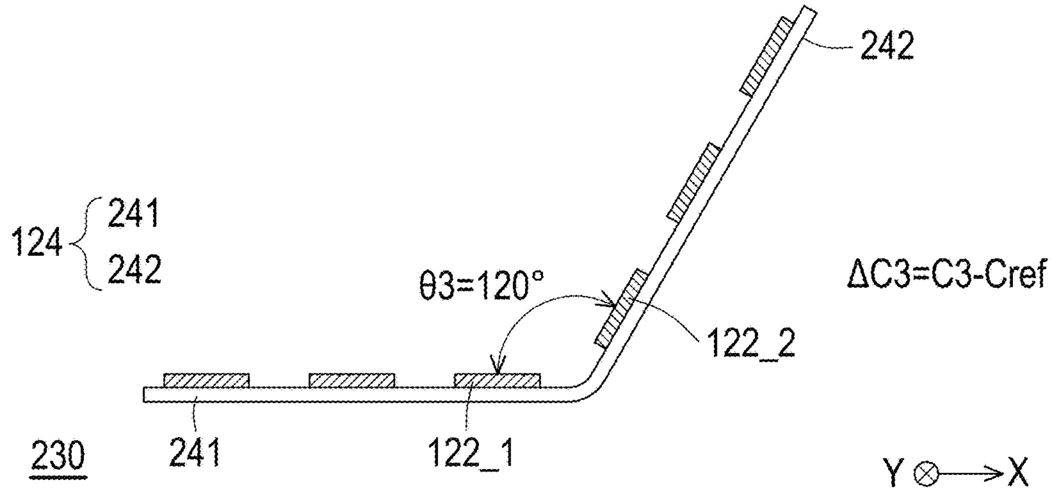
Figure 13D:
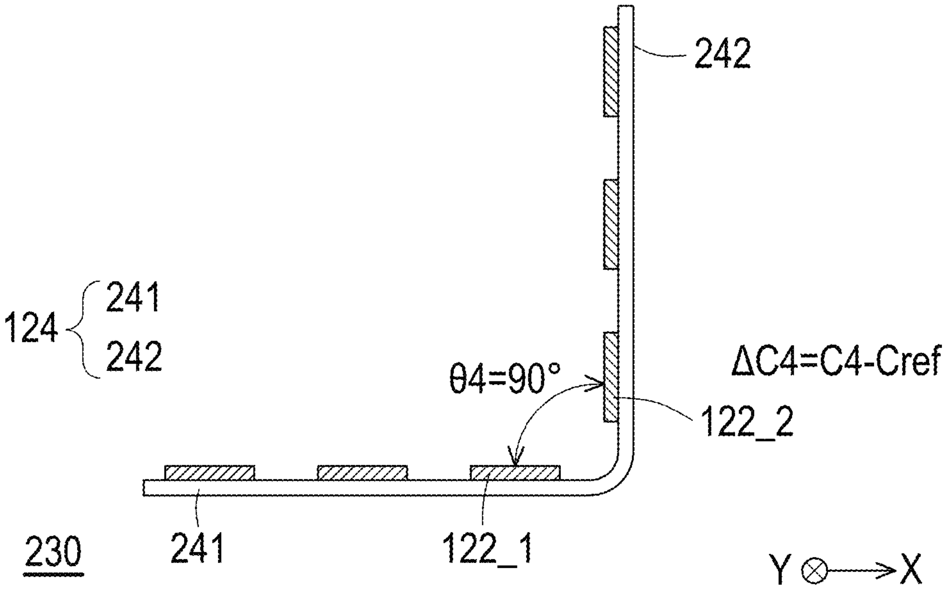
Figure 13E:
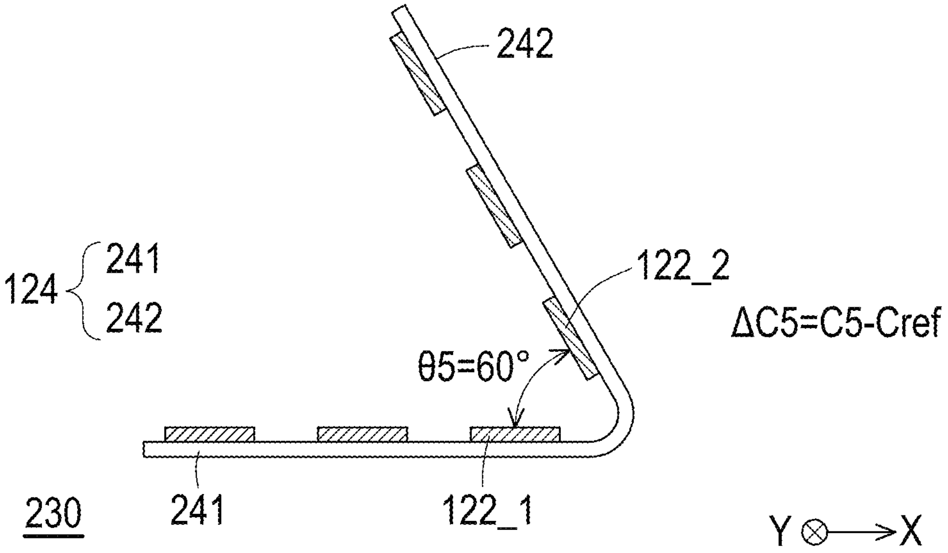
Figure 13F:
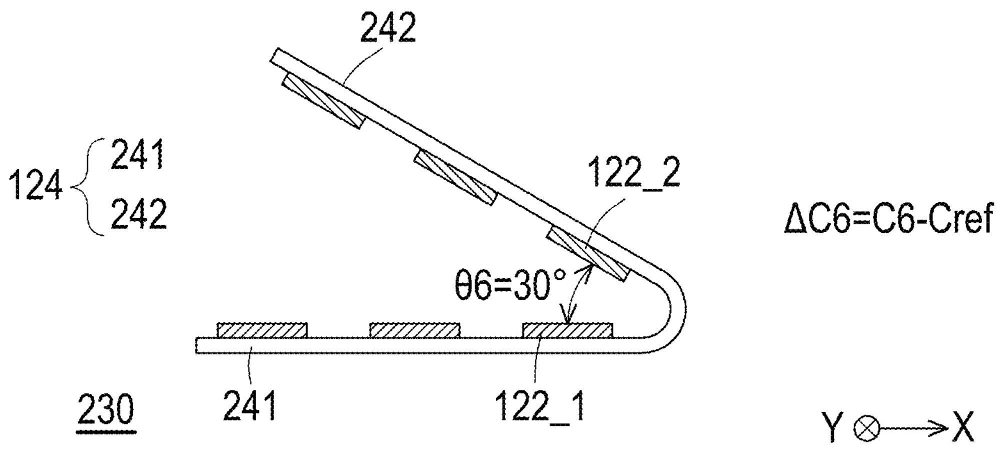
Figure 13G:
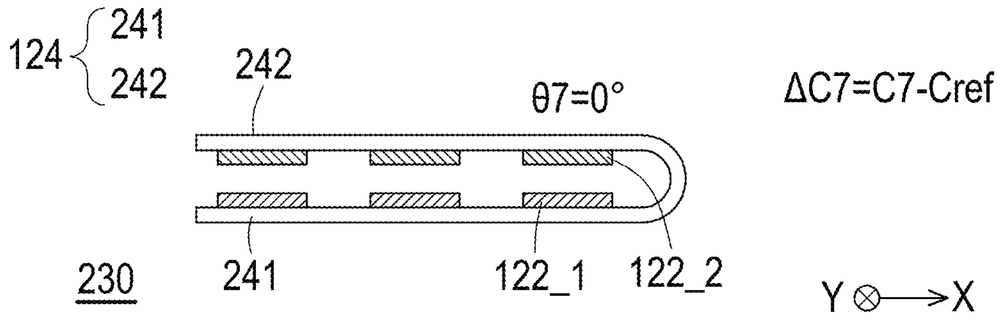

Taking FIG. 13A and FIG. 13C for another example, in FIG. 13C, a capacitor with a capacitance value C3 between the first touch sensor 122_1 and the second touch sensor 122_2 is generated and can be sensed, and thus a capacitance variation ΔC3 of the first touch sensor 122_1 and the second touch sensor 122_2 relative to the capacitance value Cref is calculated. That is, the capacitance variation ΔC3=C3−Cref can be calculated. The folding angle θ3 between the first portion 241 and the second portion 242 can be determined as 230 degrees according to the capacitance variation ΔC3 of the first touch sensor 122_1 and the second touch sensor 122_2 and the lookup table.

The folding angles θ4, θ5, θ6 and θ7 between the first portion 241 and the second portion 242 can be determined according to the capacitance variations ΔC4, ΔC5, ΔC6 and ΔC7 of the first touch sensor 122_1 and the second touch sensor 122_2 in a similar manner.

In the present embodiment, only seven capacitance variations and folding angles are stored in the lookup table, but the disclosure is not limited thereto. In an embodiment, 360 capacitance variations and folding angles can be stored in the lookup table. In the present embodiment, the capacitance value C1 of the folding angle θ1 is taken as a reference to calculate capacitance variations, but the disclosure is not limited thereto. In an embodiment, other capacitance values of the folding angles can also be taken as the reference to calculate capacitance variations.

In addition, the lookup table showing the relationship between capacitance variations and folding angles can be generated and pre-stored in the driver circuit for any given foldable touch display panel.

FIG. 13A to FIG. 13G shows the foldable touch display panel 230 is folded in a manner of inner fold, and the display driving device 220 can detect the folding angle using touch sensors. In other embodiments, the foldable touch display panel 230 can be folded in a manner of outer fold.

Figure 14A:
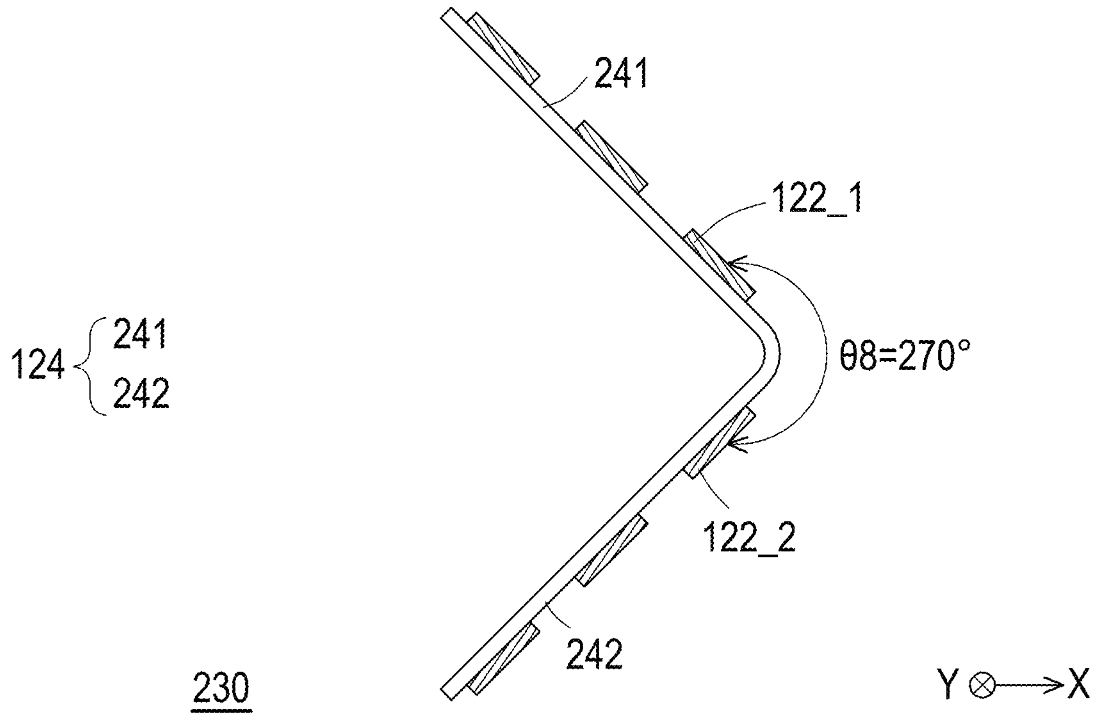
FIG. 14A and FIG. 14B respectively illustrate the foldable touch display panel which has different folding angles according to embodiments of the disclosure.
Figure 14B:
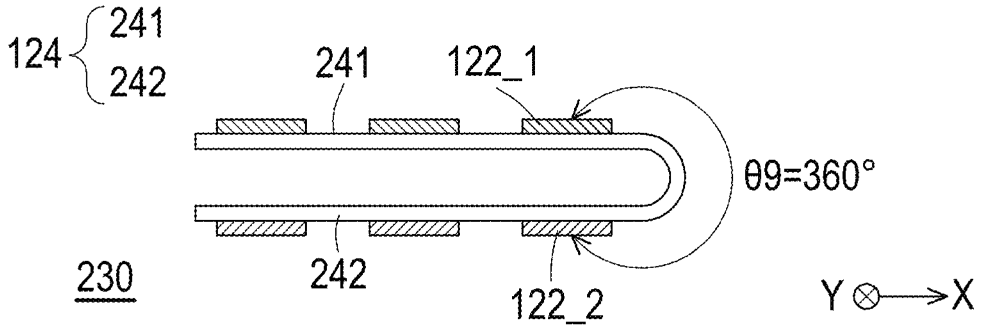

FIG. 14A and FIG. 14B respectively illustrate the foldable touch display panel which has different folding angles according to embodiments of the disclosure. Referring to FIG. 14A and FIG. 14B, FIG. 14A and FIG. 14B shows the foldable touch display panel 230 is folded in the manner of outer fold in different folding angles, and the display driving device 220 can also detect the folding angle using touch sensors or other components, e.g. panel sensors or wire routing RC value calculation. The method for detecting folding angles of this embodiment is sufficiently taught, suggested, and embodied in the embodiments illustrated in FIG. 12 to FIG. 13G, and therefore no further description is provided herein.

In the disclosure, the display driving device 220 can selectively drive the foldable touch display panel 230 to operate in either the full panel display mode or the partial panel display mode according to folded states. The driving method of the foldable touch display panel 230 is sufficiently taught, suggested, and embodied in the embodiments illustrated in FIG. 1 to FIG. 11, and therefore no further description is provided herein.

In addition, the display driving device 220 can also select compensation parameters according to folded states, to compensate folded areas of the foldable touch display panel 230.

Figure 15:
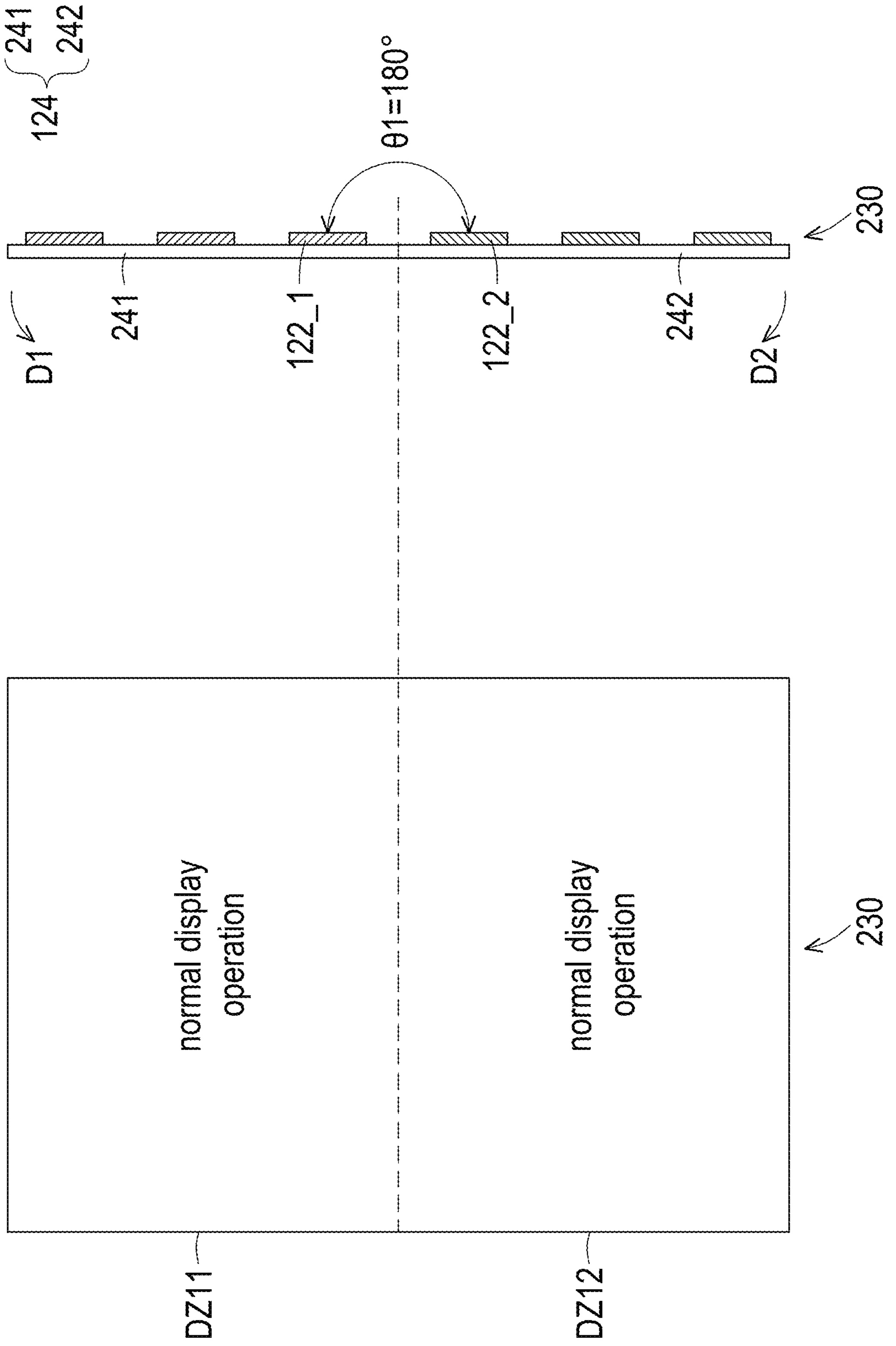
FIG. 15 illustrates the foldable touch display panel which has the folding angle of 180 degrees according to an embodiment of the disclosure.

FIG. 15 illustrates the foldable touch display panel which has the folding angle of 180 degrees according to an embodiment of the disclosure. Referring to FIG. 15, corresponding display areas are also illustrated in FIG. 15. In the folded state of FIG. 15, the folding angle θ1 is 180 degrees, and the foldable touch display panel 230 will be folded outward in folding directions D1 and D2.

The display driving device 220 can detect the folded state of FIG. 15 using touch sensors and drive the foldable touch display panel 230 to operate in the full panel display mode similar to FIG. 4 according to the detected folded state. In the present embodiment, the display driving device 220 may select at least one first compensation parameter to compensate the partial display areas DZ11 and DZ12 of the foldable touch display panel 230. The at least one first compensation parameter is corresponding to the folded state having the folding angle θ1=180 degrees.

Figure 16:
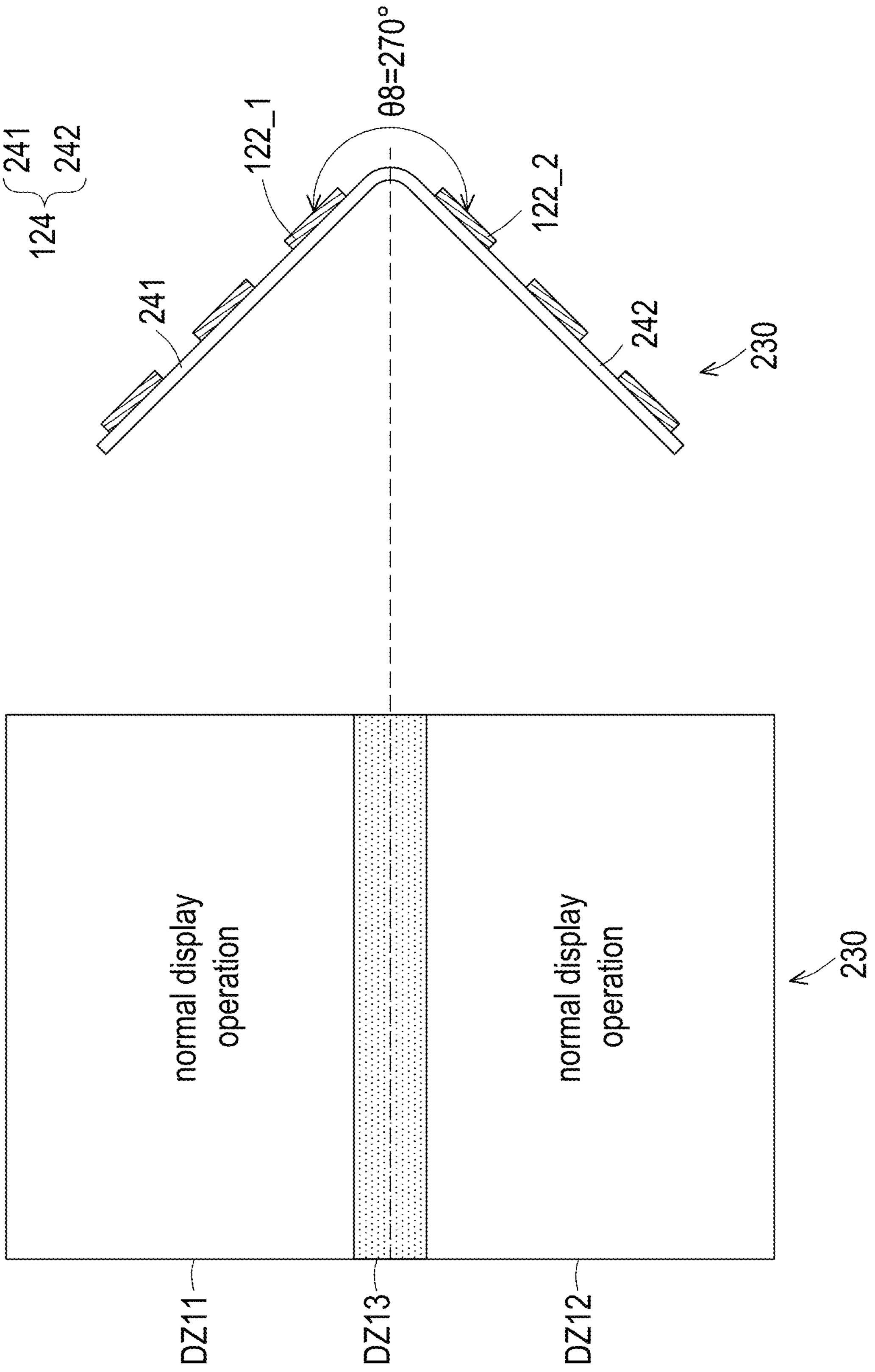
FIG. 16 illustrates the foldable touch display panel which has the folding angle of 270 degrees according to an embodiment of the disclosure.

FIG. 16 illustrates the foldable touch display panel which has the folding angle of 270 degrees according to an embodiment of the disclosure. Referring to FIG. 16, corresponding display areas DZ11 and DZ 21 are also illustrated in FIG. 16. In the folded state of FIG. 16, the folding angle θ8 is 270 degrees, and there is a folded area DZ13 existing between the partial display areas DZ11 and DZ12. The folded area DZ13 partially overlaps with the partial display areas DZ11 and DZ12.

The display driving device 220 can detect the folded state of FIG. 16 using touch sensors and drive the foldable touch display panel 230 to operate in the full panel display mode according to the detected folded state. In the present embodiment, the display driving device 220 may select at least one second compensation parameter to compensate the partial display areas DZ11 and DZ12 and the folded area DZ13 of the foldable touch display panel 230. The at least one second compensation parameter is corresponding to the folded state having the folding angle θ8=270 degrees. Therefore, the folded area DZ13 can be further compensated using the at least one second compensation parameter when the foldable touch display panel 230 is folded.

Figure 17:
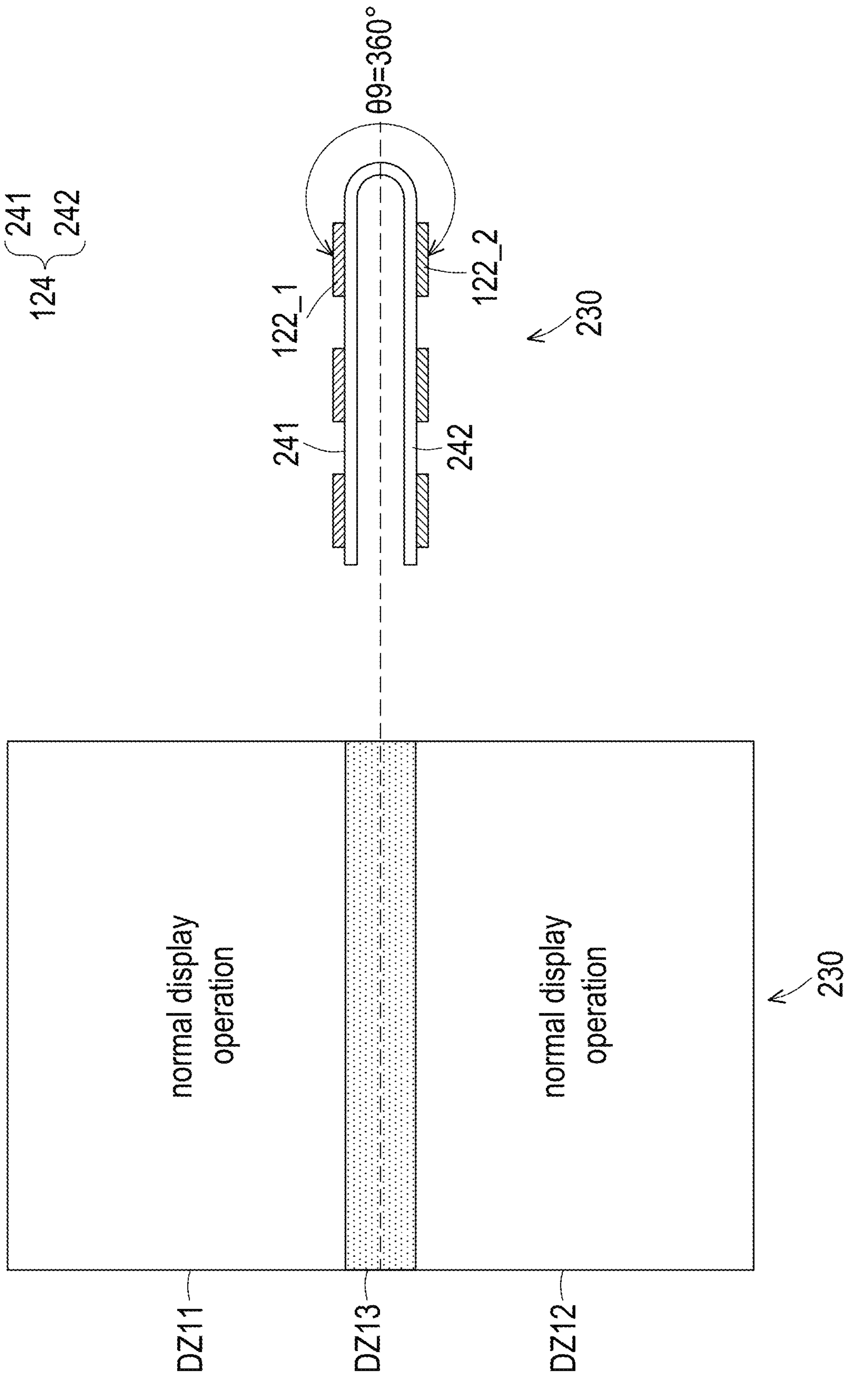
FIG. 17 illustrates the foldable touch display panel which has the folding angle of 360 degrees according to an embodiment of the disclosure.

FIG. 17 illustrates the foldable touch display panel which has the folding angle of 360 degrees according to an embodiment of the disclosure. Referring to FIG. 17, the folding angle θ9 is 360 degrees. In this embodiment, the display driving device 220 also drives the foldable touch display panel 230 to operate in the full panel display mode, but the display driving device 220 selects at least one third compensation parameter to compensate the partial display areas DZ11 and DZ12 and the folded area DZ13 of the foldable touch display panel 230. The at least one third compensation parameter is corresponding to the folded state having the folding angle θ9=360 degrees. Therefore, the folded area DZ13 can be compensated using different compensation parameters when the folding angle changes.

Figure 18:
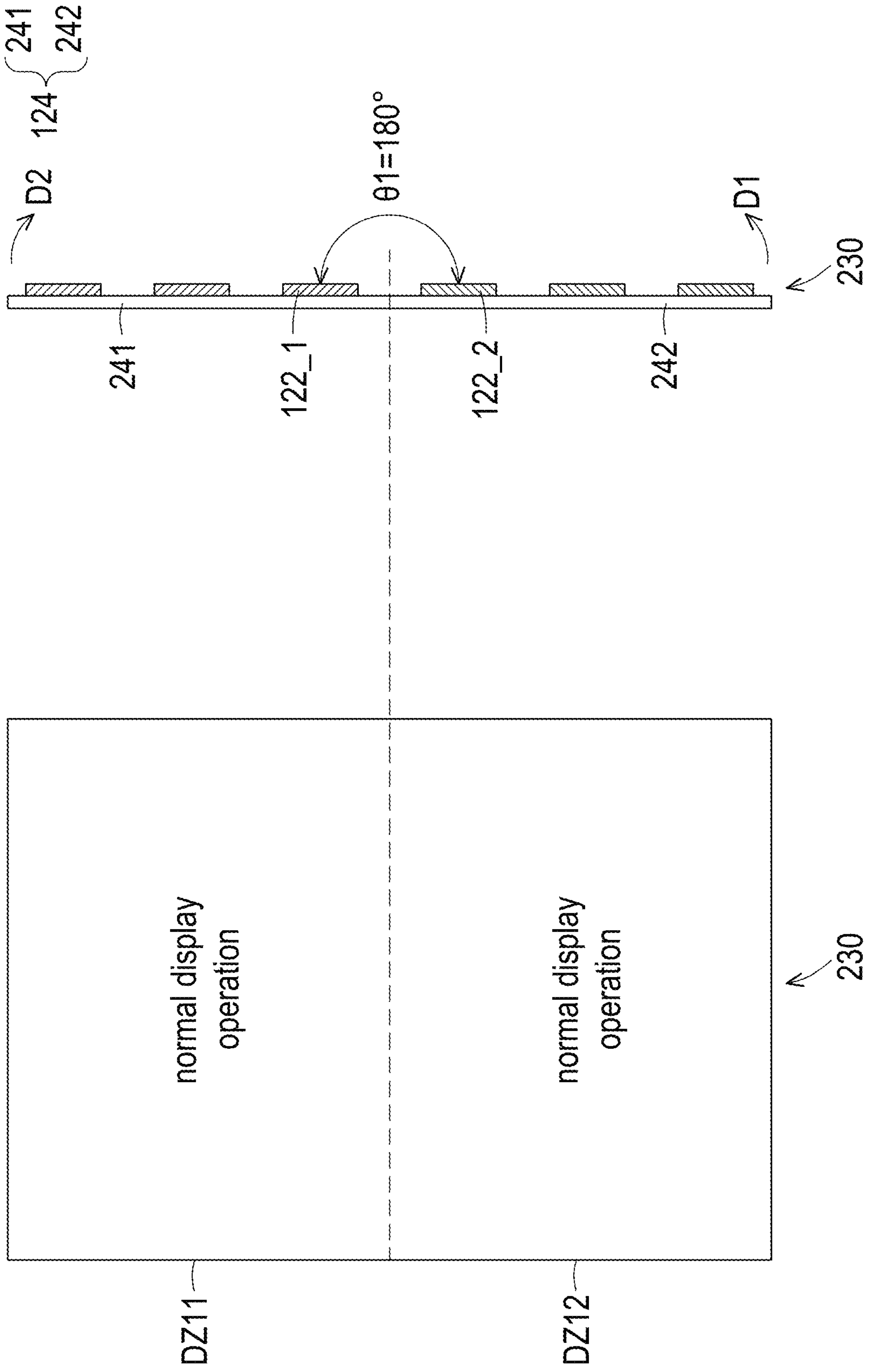
FIG. 18 illustrates the foldable touch display panel which has the folding angle of 180 degrees according to another embodiment of the disclosure.

FIG. 18 illustrates the foldable touch display panel which has the folding angle of 180 degrees according to another embodiment of the disclosure. Referring to FIG. 18, the foldable touch display panel 230 will be folded inward in the folding directions D1 and D2. The display driving device 220 also drives the foldable touch display panel 230 to operate in the full panel display mode similar to FIG. 4 according to the detected folded state, and selects the at least one first compensation parameter to compensate the partial display areas DZ11 and DZ12 of the foldable touch display panel 230.

Figure 19:
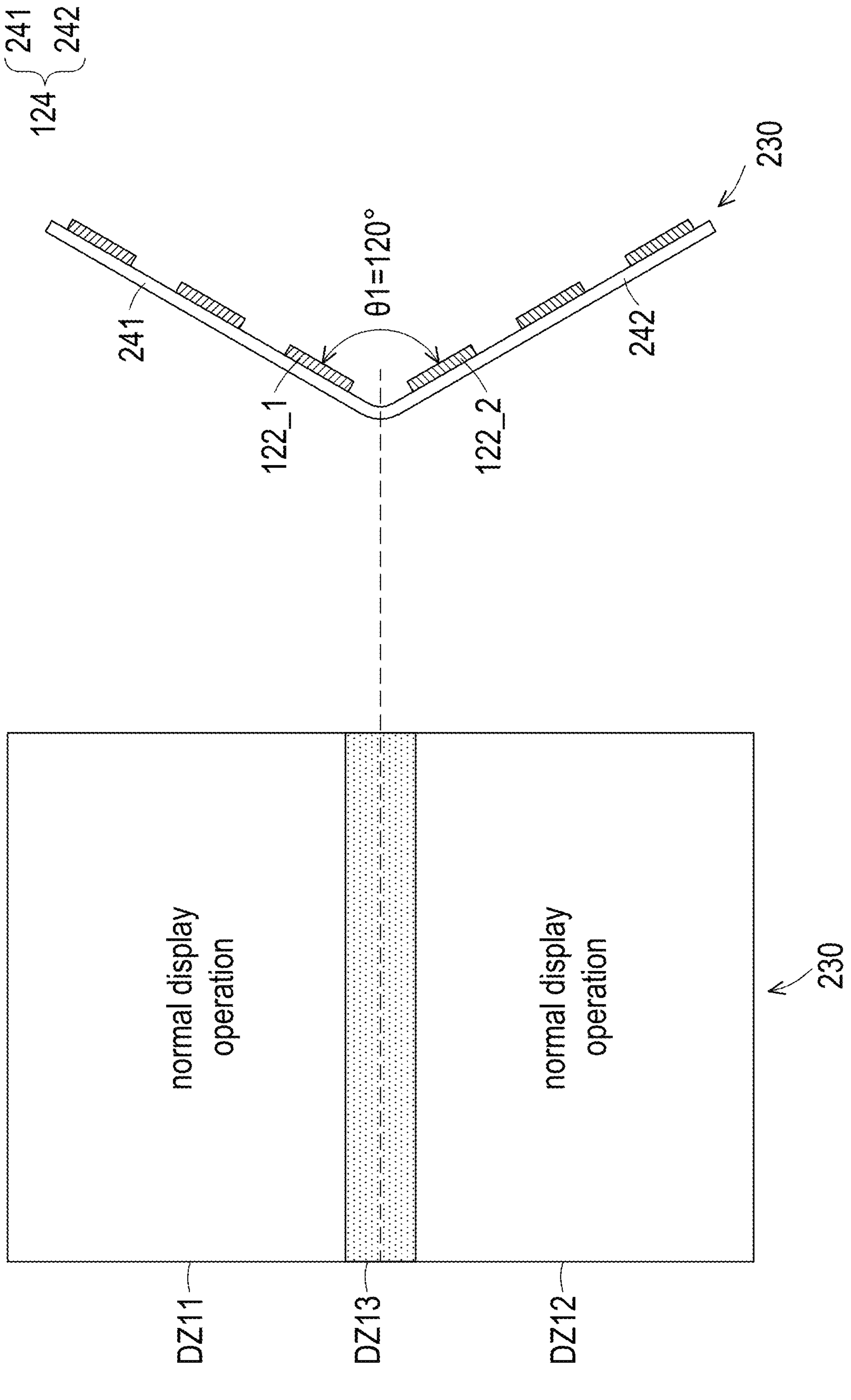
FIG. 19 illustrates the foldable touch display panel which has the folding angle of 120 degrees according to an embodiment of the disclosure.

FIG. 19 illustrates the foldable touch display panel which has the folding angle of 120 degrees according to an embodiment of the disclosure. Referring to FIG. 19, the folding angle θ3 is 120 degrees. In this embodiment, the display driving device 220 also drives the foldable touch display panel 230 to operate in the full panel display mode, but the display driving device 220 selects at least one fourth compensation parameter to compensate the partial display areas DZ11 and DZ12 and the folded area DZ13 of the foldable touch display panel 230. The at least one fourth compensation parameter is corresponding to the folded state having the folding angle θ3=120 degrees. Therefore, the folded area DZ13 can be compensated using different compensation parameters when the folding angle changes.

Figure 20:
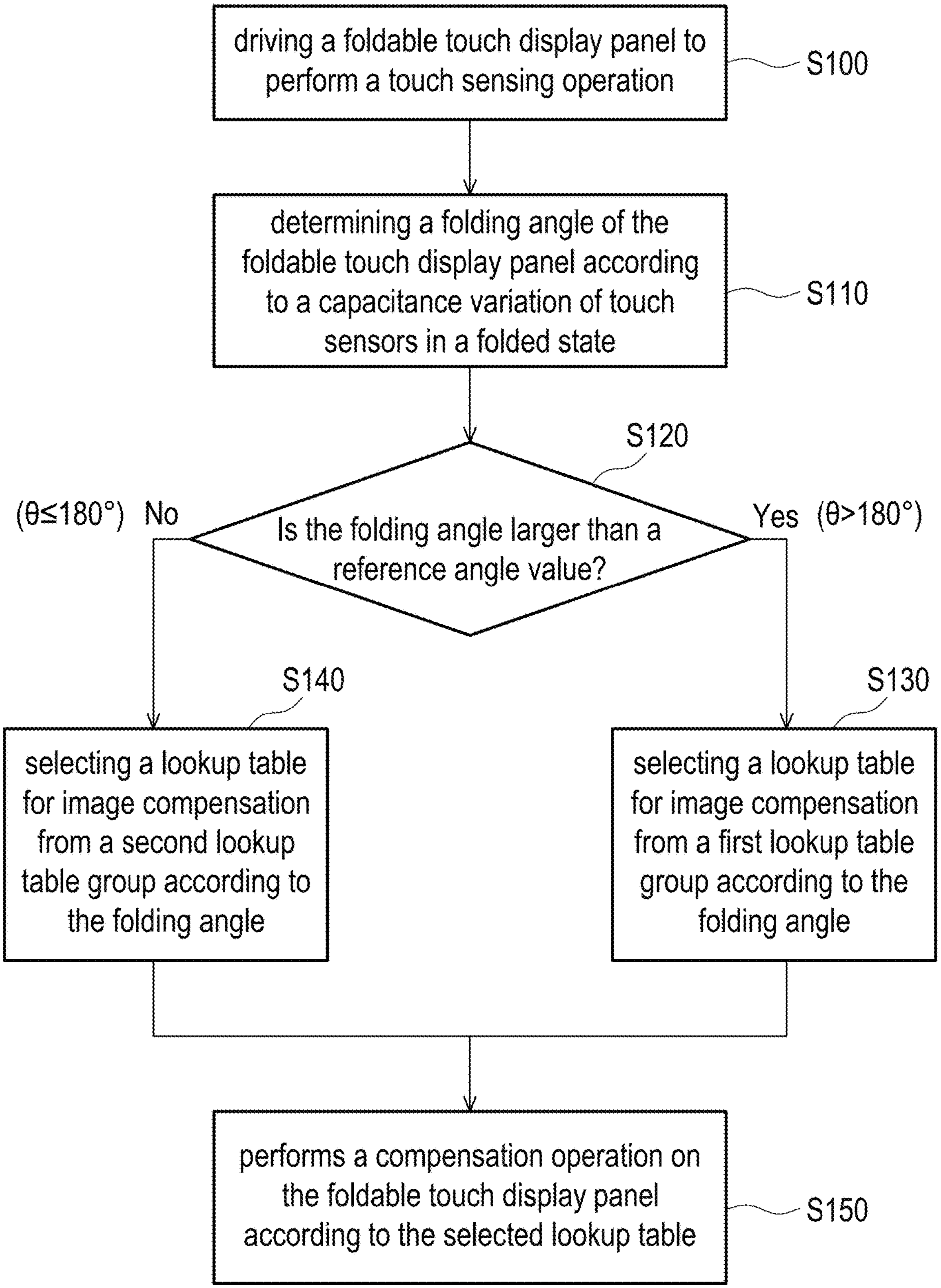
FIG. 20 is a schematic flowchart of a driving method of a display apparatus according to an embodiment of the disclosure.

FIG. 20 is a schematic flowchart of a driving method of a display apparatus according to an embodiment of the disclosure. Referring to FIG. 12 and FIG. 20, the driving method of the display apparatus of FIG. 20 is at least adapted to the display apparatus 200 of FIG. 12, but the disclosure is not limited thereto.

Taking the display apparatus 200 for example, in step S100, the display driving device 220 drives the foldable touch display panel 130 to perform a touch sensing operation. In step S110, the display driving device 220 determines a folding angle θ between the first portion 241 and the second portion 242 according to a capacitance variation of the first touch sensor 122 1 and the second touch sensor 122_2 in a folded state. The first touch sensors 122_1 are disposed on the first portion 241, and the second touch sensors 122_2 are disposed on the second portion 242. In the present embodiment, the display driving device 220 drives the foldable touch display panel 230 to operate in the full panel display mode.

In step S120, the display driving device 220 determines whether the folding angle θ is larger than a first reference angle value, e.g. 180 degrees. When the folding angle θ is larger than the first reference angle value, it indicates that the foldable touch display panel 230 is folded in the manner of outer fold, and the display driving device 220 performs step S130. When the folding angle θ is smaller than or equal to the first reference angle value, it indicates that the foldable touch display panel 230 is folded in the manner of inner fold, and the display driving device 220 performs step S140.

In step S130, the display driving device 220 selects a lookup table for image compensation from a specified lookup table group according to the folding angle θ. The specified lookup table group includes a plurality of lookup tables. For example, table 2 shows the relationship between folding angle ranges and lookup tables of a first lookup table group, and is stored in a memory circuit.

TABLE 2

| folding angle ranges (degrees) | first lookup table group |
|---|---|
| 181~210 | LUT#11 |
| 211~240 | LUT#12 |
| 241~270 | LUT#13 |
| 271~300 | LUT#14 |
| 301~330 | LUT#15 |
| 331~360 | LUT#16 |

The relationship between folding angle ranges and lookup tables in table 2 are only taken for example, and the disclosure is not limited thereto.

In step S140, the display driving device 220 selects a lookup table for image compensation from another specified lookup table group according to the folding angle θ. For example, table 3 shows the relationship between folding angle ranges and lookup tables of a second lookup table group, and is stored in the memory circuit.

TABLE 3

| folding angle ranges (degrees) | second lookup table group |
|---|---|
| 0~30 | LUT#21 |
| 31~60 | LUT#22 |
| 61~90 | LUT#23 |
| 91~120 | LUT#24 |
| 121~150 | LUT#25 |
| 151~180 | LUT#26 |

The relationship between folding angle ranges and lookup tables in table 3 are only taken for example, and the disclosure is not limited thereto. Each of the first lookup table group and the second lookup table group includes a plurality of lookup tables, and the plurality of lookup tables are grouped into the first lookup table group and the second lookup table group according to folding angle ranges.

In step S150, the display driving device 220 performs a compensation operation on the foldable touch display panel 230 according to the selected lookup table. In the present embodiment, the compensation operation may include demura, overdriving compensation (ODC), crosstalk compensation (CTC), edge color compensation (ECC), and/or deburn-in, but the disclosure is not limited thereto. The lookup table for image compensation includes compensation parameters corresponding to the compensation operation.

Figure 21:
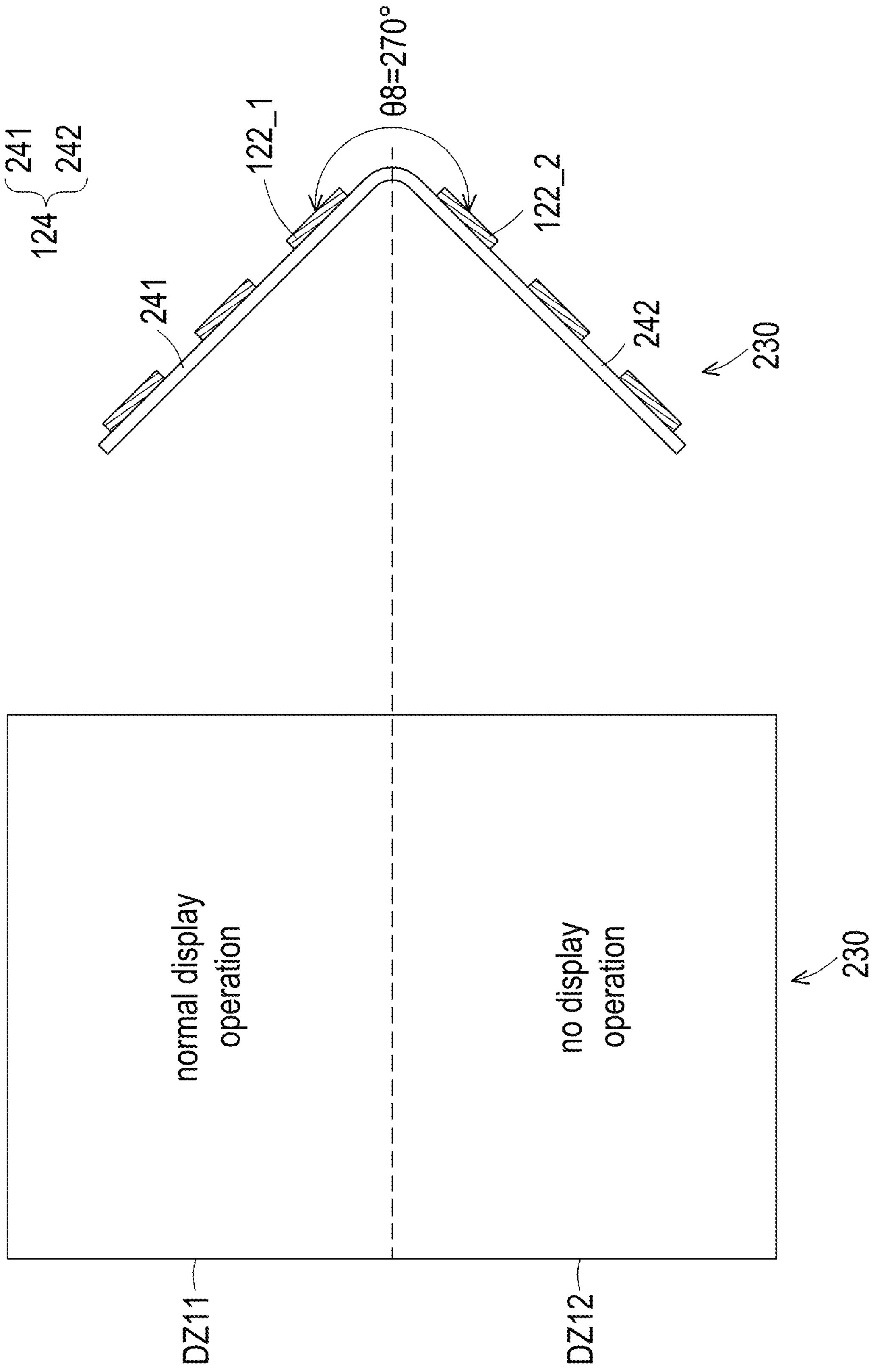
FIG. 21 illustrates the foldable touch display panel which has the folding angle of 270 degrees according to another embodiment of the disclosure.

FIG. 21 illustrates the foldable touch display panel which has the folding angle of 270 degrees according to another embodiment of the disclosure. Referring to FIG. 21, corresponding display areas DZ11 and DZ 21 are also illustrated in FIG. 21. In the folded state of FIG. 21, the display driving device 220 may drive the foldable touch display panel 230 to operate in the partial panel display mode according to the detected folded state.

In the present embodiment, touch sensors may also be configured to detect whether partial display areas are in contact with an external object. For instance, the touch sensors of the partial display area DZ12 may detect capacitance variation due to an external object, and according to the detection result, the partial display area DZ12 is in contact with the external object, with the external object covering the partial display area DZ12. Therefore, the partial display area DZ12 is set as the inactive area for power saving, and has no display operation in the partial panel display mode similar to FIG. 6.

Figure 22:
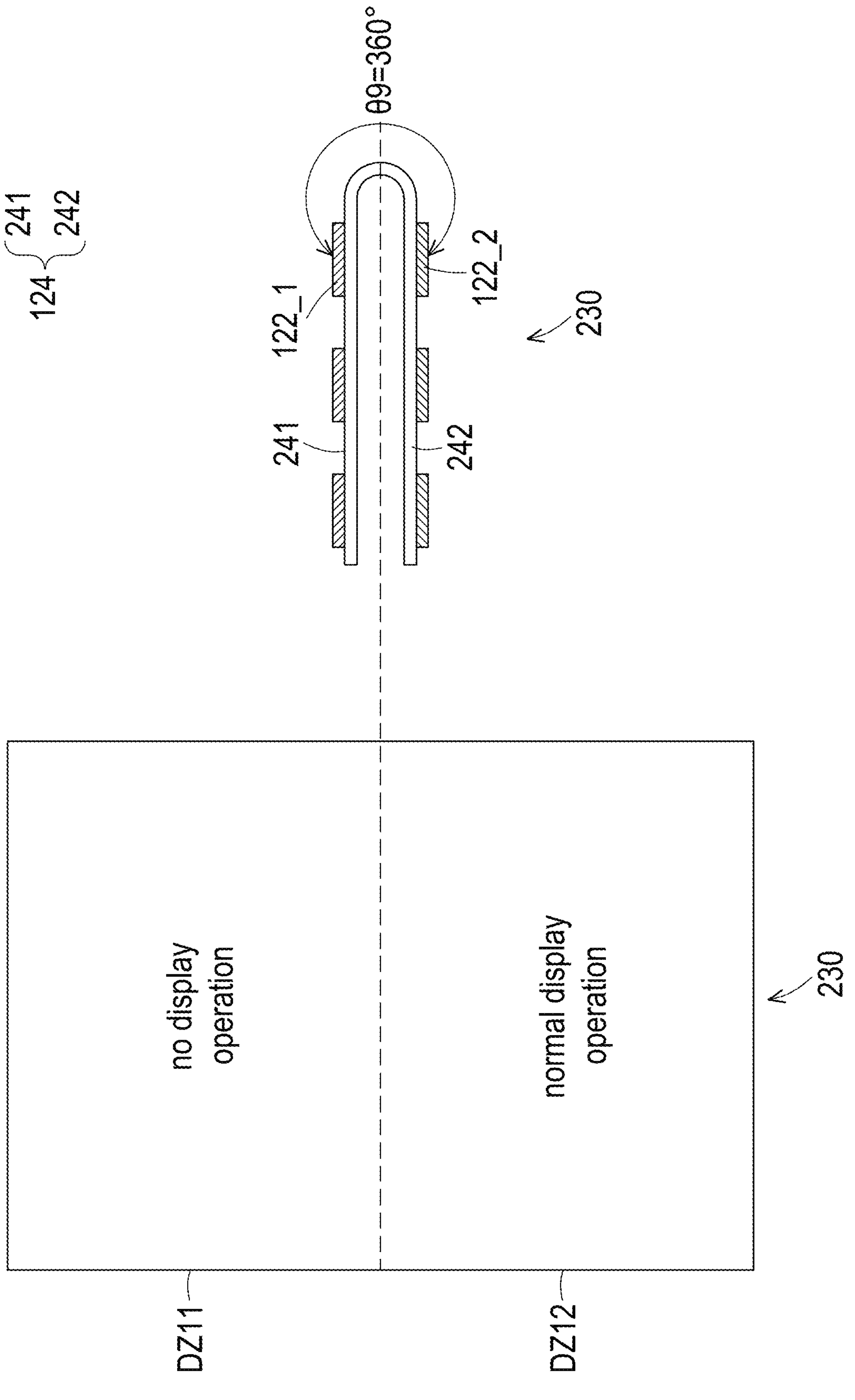
FIG. 22 illustrates the foldable touch display panel which has the folding angle of 360 degrees according to an embodiment of the disclosure.

FIG. 22 illustrates the foldable touch display panel which has the folding angle of 360 degrees according to an embodiment of the disclosure. Referring to FIG. 22, the folding angle θ9 is 360 degrees, and the display driving device 220 may also drive the foldable touch display panel 230 to operate in the partial panel display mode according to the detected folded state.

In the present embodiment, touch sensors may also be configured to detect whether partial display areas are in contact with an external object. For instance, the touch sensors of the partial display area DZ11 may detect capacitance variation due to an external object, and according to the detection result, the partial display area DZ11 is in contact with the external object, with the external object covering the partial display area DZ11. Therefore, the partial display area DZ11 is set as the inactive area for power saving, and has no display operation in the partial panel display mode similar to FIG. 9.

Figure 23:
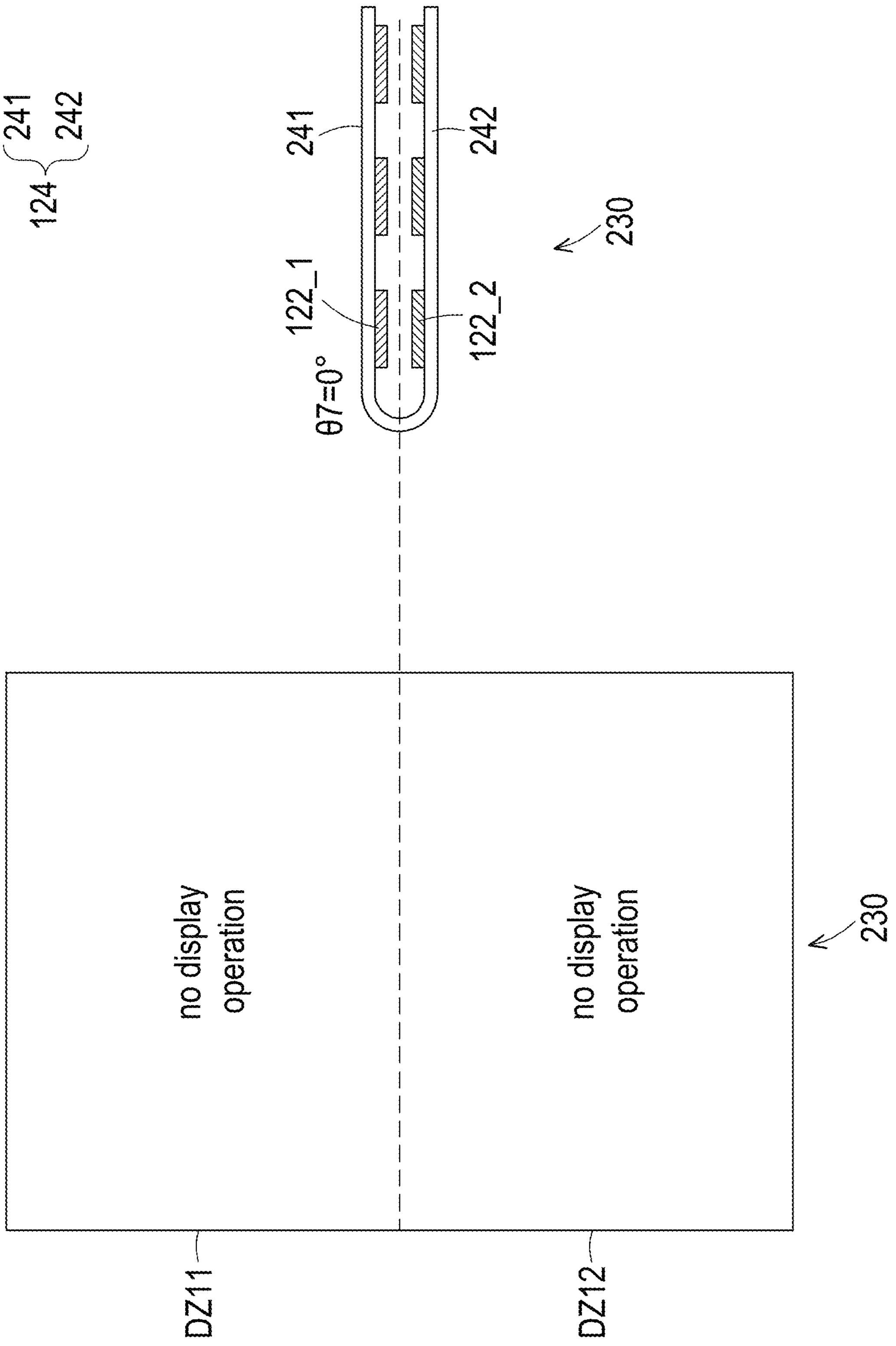
FIG. 23 illustrates the foldable touch display panel which has the folding angle of 0 degree according to another embodiment of the disclosure.

FIG. 23 illustrates the foldable touch display panel which has the folding angle of 0 degree according to another embodiment of the disclosure. Referring to FIG. 23, the folding angle θ7 is 0 degree, and the display driving device 220 sets the partial display area DZ11 and DZ12 as the inactive area. The display operation of the partial display area DZ11 and DZ12 is turned off for power saving, and have no display operation.

Figure 24:
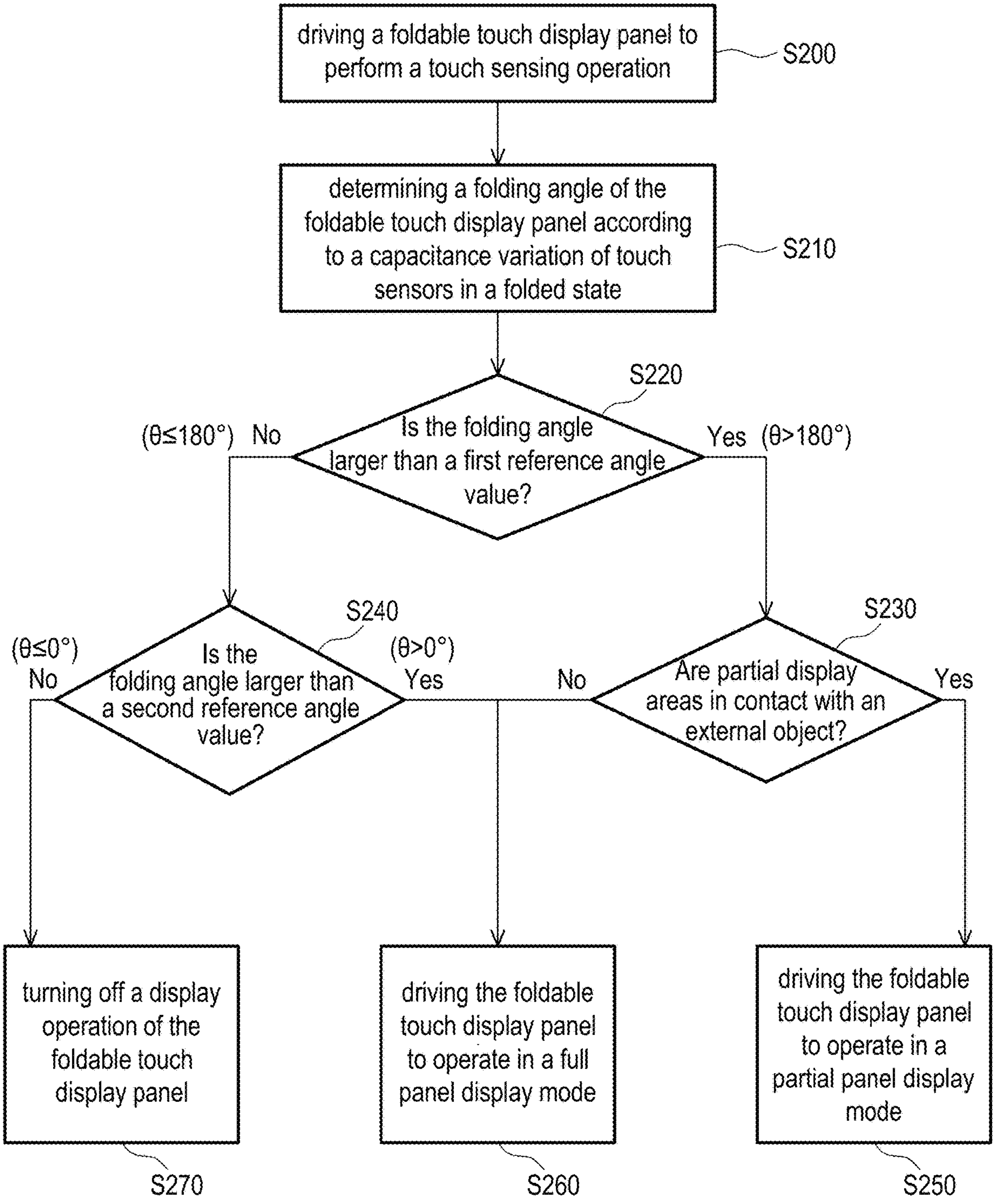
FIG. 24 is a schematic flowchart of a driving method of a display apparatus according to another embodiment of the disclosure.

FIG. 24 is a schematic flowchart of a driving method of a display apparatus according to another embodiment of the disclosure. Referring to FIG. 12 and FIG. 24, the driving method of the display apparatus of FIG. 24 is at least adapted to the display apparatus 200 of FIG. 12, but the disclosure is not limited thereto.

Taking the display apparatus 200 for example, in step S200, the display driving device 220 drives the foldable touch display panel 130 to perform a touch sensing operation. In step S210, the display driving device 220 determines a folding angle θ between the first portion 241 and the second portion 242 according to a capacitance variation of the first touch sensor 122_1 and the second touch sensor 122_2 in a folded state.

In step S220, the display driving device 220 determines whether the folding angle θ is larger than the first reference angle value, e.g. 180 degrees. When the folding angle θ is larger than the first reference angle value, it indicates that the foldable touch display panel 230 is folded in the manner of outer fold, and the display driving device 220 performs step S230. When the folding angle θ is smaller than or equal to the first reference angle value, it indicates that the foldable touch display panel 230 is folded in the manner of inner fold, and the display driving device 220 performs step S240.

In step S230, the display driving device 220 determines whether the partial display areas are in contact with an external object. For example, when the display driving device 220 determines that the partial display area DZ12 is in contact with the external object, with the external object covering the partial display area DZ12, the display driving device 220 drives the foldable touch display panel 230 to operate in the partial panel display mode in step S250. The display driving device 220 sets the partial display area DZ12 as the inactive area, and the partial display area DZ12 has no display operation in the partial panel display.

On the contrary, when the display driving device 220 determines that no partial display area is in contact with the external object, the display driving device 220 performs step S260, and drives the foldable touch display panel 230 to operate in the full panel display mode.

On the other hand, in step S240, the display driving device 220 determines whether the folding angle θ is larger than the second reference angle value, e.g. 0 degree. When the folding angle θ is larger than the second reference angle value, the display driving device 220 performs step S260, and drives the foldable touch display panel 230 to operate in the full panel display mode. When the folding angle θ is smaller than or equal to the second reference angle value, the display driving device 220 performs step S270, and turns off the display operation of the foldable touch display panel 230.

Figure 25:
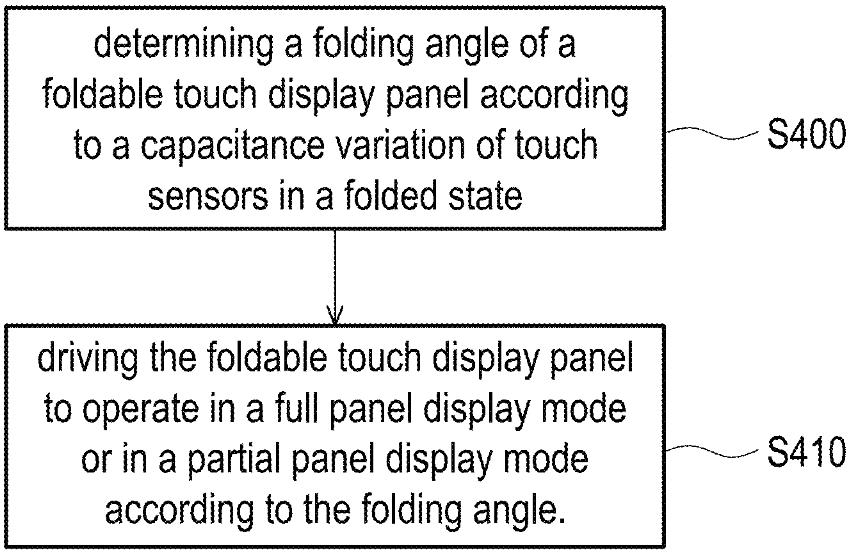
FIG. 25 is a schematic flowchart of a driving method of a display apparatus according to another embodiment of the disclosure.

FIG. 25 is a schematic flowchart of a driving method of a display apparatus according to another embodiment of the disclosure. Referring to FIG. 12 and FIG. 25, the driving method of the display apparatus of FIG. 25 is at least adapted to the display apparatus 200 of FIG. 12, but the disclosure is not limited thereto.

Taking the display apparatus 200 for example, in step S400, the display driving device 220 determines the folding angle θ of the foldable touch display panel 230 according to a capacitance variation of the touch sensors in the folded state. In step S410, the display driving device 220 drives the foldable touch display panel 230 to operate in the full panel display mode or in the partial panel display mode according to the folding angle θ.

The driving method of the display apparatus of the present embodiment is sufficiently taught, suggested, and embodied in the embodiments illustrated in FIG. 12 to FIGS. 24, and therefore no further description is provided herein.

In summary, in the embodiments of the disclosure, the display apparatus can selectively operate in either a full panel display mode or a partial panel display mode according to folded states for power saving. In addition, the display driving device can select a lookup table for image compensation from a specified lookup table group according to the folding angle. Therefore, the foldable touch display panel can be adaptively compensated according to folded states.

Although the disclosure has been disclosed above through embodiments, it is not intended to limit the disclosure. Anyone with ordinary knowledge in the technical field can make some modifications and refinement without departing from the spirit and scope of the disclosure. Therefore, the scope to be protected by the disclosure shall be determined by the appended claims.

What is claimed is:

1. A display apparatus, comprising:

a foldable touch display panel, comprising a plurality of touch sensors; and a display driving device, coupled to the foldable touch display panel, wherein the display driving device is configured to:

determine a folding angle of the foldable touch display panel according to a capacitance variation of the touch sensors in a folded state;

drive the foldable touch display panel to operate in a full panel display mode or in a partial panel display mode according to the folding angle;

determine whether the folding angle is larger than a first reference angle value;

when the folding angle is larger than the first reference angle value, select a first lookup table for image compensation from a first lookup table group; and when the folding angle is smaller than or equal to the first reference angle value, select a second lookup table for image compensation from a second lookup table group.

2. The display apparatus according to claim 1, wherein the display driving device is further configured to:

determine whether the folding angle is larger than a first reference angle value;

when the folding angle is larger than the first reference angle value, drive the foldable touch display panel to operate in the partial panel display mode; and when the folding angle is smaller than or equal to the first reference angle value, drive the foldable touch display panel to operate in the full panel display mode.

3. The display apparatus according to claim 2, wherein the foldable touch display panel comprises a plurality of partial display areas, the display driving device is further configured to:

determine whether one of the partial display areas is in contact with an object;

when the one of the partial display areas is in contact with the object, drive the foldable touch display panel to operate in the partial panel display mode, wherein the one of the partial display areas is set as an inactive area; and when the one of the partial display areas is not in contact with the object, drive the foldable touch display panel to operate in the full panel display mode.

4. The display apparatus according to claim 2, wherein the display driving device is further configured to:

determine whether the folding angle is larger than a second reference angle value, wherein the second reference angle value is smaller than the first reference angle value;

when the folding angle is larger than the second reference angle value, drive the foldable touch display panel to operate in the full panel display mode; and when the folding angle is smaller than or equal to the second reference angle value, turn off a display operation of the foldable touch display panel.

5. The display apparatus according to claim 2, wherein when the folding angle is larger than the first reference angle value, it indicates that the foldable touch display panel is folded in a manner of outer fold; and when the folding angle is smaller than or equal to the first reference angle value, it indicates that the foldable touch display panel is folded in the manner of inner fold.

6. The display apparatus according to claim 1, wherein the display driving device is further configured to:

perform a compensation operation on the foldable touch display panel according to the first lookup table or the second lookup table.

7. The display apparatus according to claim 1, wherein each of the first lookup table group and the second lookup table group includes a plurality of lookup tables, and the plurality of lookup tables are grouped into the first lookup table group and the second lookup table group according to folding angle ranges.

8. The display apparatus according to claim 7, wherein each of the lookup tables comprises compensation parameters corresponding to a compensation operation.

9. A display driving device, coupled to the foldable touch display panel of claim 1, and configured to determine a folding angle of the foldable touch display panel according to a capacitance variation of the touch sensors in a folded state, and drive the foldable touch display panel to operate in a full panel display mode or in a partial panel display mode according to the folding angle.

10. A driving method of a display apparatus, wherein the display apparatus comprises a foldable touch display panel, and the foldable touch display panel comprises a plurality of touch sensors, the driving method comprising:

determining a folding angle of the foldable touch display panel according to a capacitance variation of the touch sensors in a folded state;

driving the foldable touch display panel to operate in a full panel display mode or in a partial panel display mode according to the folding angle;

determining whether the folding angle is larger than a first reference angle value;

when the folding angle is larger than the first reference angle value, selecting a first lookup table for image compensation from a first lookup table group; and when the folding angle is smaller than or equal to the first reference angle value, selecting a second lookup table for image compensation from a second lookup table group.

11. The driving method of the display apparatus according to claim 10, further comprising:

determining whether the folding angle is larger than a first reference angle value;

when the folding angle is larger than the first reference angle value, driving the foldable touch display panel to operate in the partial panel display mode; and when the folding angle is smaller than or equal to the first reference angle value, driving the foldable touch display panel to operate in the full panel display mode.

12. The driving method of the display apparatus according to claim 11, wherein the foldable touch display panel comprises a plurality of partial display areas, the driving method of the display apparatus further comprises:

determining whether one of the partial display areas is in contact with an object;

when the one of the partial display areas is in contact with the object, driving the foldable touch display panel to operate in the partial panel display mode, wherein the one of the partial display areas is set as an inactive area; and when the one of the partial display areas is not in contact with the object, driving the foldable touch display panel to operate in the full panel display mode.

13. The driving method of the display apparatus according to claim 11, further comprising:

determining whether the folding angle is larger than a second reference angle value, wherein the second reference angle value is smaller than the first reference angle value;

when the folding angle is larger than the second reference angle value, driving the foldable touch display panel to operate in the full panel display mode; and when the folding angle is smaller than or equal to the second reference angle value, turning off a display operation of the foldable touch display panel.

14. The driving method of the display apparatus according to claim 11, wherein when the folding angle is larger than the first reference angle value, it indicates that the foldable touch display panel is folded in a manner of outer fold; and when the folding angle is smaller than or equal to the first reference angle value, it indicates that the foldable touch display panel is folded in the manner of inner fold.

15. The driving method of the display apparatus according to claim 10, further comprising:

perform a compensation operation on the foldable touch display panel according to the first lookup table or the second lookup table.

16. The driving method of the display apparatus according to claim 10, wherein each of the first lookup table group and the second lookup table group includes a plurality of lookup tables, and the plurality of lookup tables are grouped into the first lookup table group and the second lookup table group according to folding angle ranges.

17. The driving method of the display apparatus according to claim 16, wherein each of the lookup tables comprises compensation parameters corresponding to a compensation operation.

* * * * *